(12) United States Patent
Mingishi et al.

(10) Patent No.: US 7,147,582 B2
(45) Date of Patent: Dec. 12, 2006

(54) POWER TRANSMISSION DEVICE

(75) Inventors: Kiyoji Mingishi, Aichi (JP); Jun Tamenaga, Ohbu (JP); Teijirou Yamanaka, Ohbu (JP); Masahiro Shimada, Ohbu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/650,131

(22) Filed: Aug. 28, 2003

(65) Prior Publication Data
US 2004/0220008 A1    Nov. 4, 2004

(30) Foreign Application Priority Data

| Aug. 30, 2002 | (JP) | ............................ 2002-255196 |
| Jan. 7, 2003 | (JP) | ............................ 2003-001464 |
| Mar. 13, 2003 | (JP) | ............................ 2003-068369 |
| Mar. 19, 2003 | (JP) | ............................ 2003-075295 |

(51) Int. Cl.
*F16H 23/00* (2006.01)
*F16H 1/32* (2006.01)
*F16H 3/70* (2006.01)

(52) U.S. Cl. ..................... 475/163; 475/166; 475/168; 475/171; 475/178

(58) Field of Classification Search ........ 475/163–166, 475/168–170, 172, 178, 180
See application file for complete search history.

(56) References Cited

U.S. PATENT DOCUMENTS

| 5,123,883 | A | * | 6/1992 | Fukaya ...................... 475/178 |
| 5,651,747 | A | * | 7/1997 | Minegishi et al. .......... 475/176 |
| 6,440,030 | B1 | | 8/2002 | Minegishi et al. |
| 2003/0134708 | A1 | * | 7/2003 | Regner ....................... 475/178 |
| 2004/0102274 | A1 | * | 5/2004 | Tesar .......................... 475/168 |

* cited by examiner

*Primary Examiner*—Tisha Lewis
(74) *Attorney, Agent, or Firm*—Squire, Sanders & Dempsey LLP

(57) ABSTRACT

It is an object to obtain a power transmission device capable of allowing conflicting needs to coexist rationally and effectively in accordance with a driving situation. As powertransmitting mechanisms of a power transmission device, there are provided a plurality of characteristically-differentiated internally meshing planetary gear mechanisms, each having an external gear and an internal gear having external teeth and internal teeth the difference in the number of teeth between which is slight. In this structure, at least two of the internally meshing planetary gear mechanisms are disposed in parallel on a path of power transmission, and power transmission characteristics of the two mechanisms are designed to differ from each other.

44 Claims, 19 Drawing Sheets

POWER TRANSMISSION DEVICE

BACKGROUND OF THE INVENTION

1. Field of the Invention

This invention relates to a power transmission device.

2. Description of the Related Art

When various mechanical apparatuses (driven apparatuses), such as conveyers, joints of industrial-use robots, and elevators, are driven, a power transmission device is interposed between a driving source and the mechanical apparatuses. The power transmission device is used to diminish the rotational speed of power outputted from the driving source, to increase the torque, or to change the axial direction of rotation. An internally meshing planetary gear mechanism is known as a structure forming the power transmission device. The internally meshing planetary gear mechanism includes external gears and internal gears between which a difference in the number of teeth is slight.

As a concrete structure of the internally meshing planetary gear mechanism, proposals have been made of an oscillating internally-meshing structure in which one of an external gear and an internal gear oscillates with respect to the other one (see U.S. Pat. No. 6,440,030, for example) or a flexible meshing type internally-meshing structure in which a flexible external gear meshes with an internal gear while being flexed by an oval wave generator disposed inside in the radial direction.

Meanwhile, in the power transmission device applied to, for example, a conveyer or a hoisting machine, such as a winch or a sheet shutter, a function in which an output shaft does not rotate in an opposite direction, is required in spite of the fact that the external force such as gravity or human power is imposed from the side of a driven apparatus. This is termed a so-called backstop function.

As the power transmission device having the backstop function, many proposals have been made of a device that performs this function by use of a backstop bolt or a brake. However, a problem resides in the fact that a special mechanism to fulfill the backstop function is needed separately from the device body, and therefore the device will be enlarged or costs will be raised. Therefore, various proposals have been made of a power transmission device with a self-locking function in which a power-transmitting mechanism itself has the backstop function.

A power-transmitting mechanism that uses worm gears can be mentioned as a typical power-transmitting mechanism that has the self-locking function. However, a problem resides in the fact that the transmitting mechanism that uses worm gears has low transmission efficiency and great energy loss (i.e., great power consumption). Generally, a power-transmitting mechanism having the self-locking function has low transmission efficiency without being limited to the transmitting mechanism that uses worm gears.

Furthermore, in order to improve the self-locking function, the rotational resistance of members that constitute the power transmission device is usually set to be high. This adjustment improves the self-locking function, however, concurrently brings about a result of increasing the rotational resistance in the positive direction. In other words, operating efficiency in a normal operation has a tendency to be reduced proportionately with the enhancement of the self-locking function. A motor with a greater capacity is needed to obtain a strong driving force in the positive direction while having a high self-locking function. Therefore, power consumption becomes higher correspondingly therewith.

That is, the relationship between the enhancement of the self-locking function and the improvement of operating efficiency (i.e., reduction in power consumption) is like two sides of the same coin. In actuality, the fact is that a design is prepared in accordance with the characteristics of a concrete device while finding a compromise therebetween.

Besides this, design requirements in conflict with each other exist between high torque and high transmission capacity both of which are needed when activated or when accelerated (i.e., when heavily loaded) and low noise and less vibration both of which are needed when steadily operated (i.e., when lightly loaded).

These mutually conflicting requirements can be concurrently satisfied by automatically changing a transmission path or a transmission gear ratio of a power-transmitting mechanism in accordance with a situation by use of an automatic clutch or an automatic gear-shifting mechanism. However, if so, the device will become more complex, and costs will be inevitably raised.

The present invention has been made in consideration of these circumstances. It is therefore an object of the present invention to provide a power transmission device especially capable of automatically satisfying the mutually conflicting requirements mentioned above with a simple structure and at low costs.

SUMMARY OF THE INVENTION

In order to achieve the object, the present invention is characterized in that a power transmission device having an input shaft and an output shaft includes a plurality of internally meshing planetary gear mechanisms as power-transmitting mechanisms of the power transmission device, each having an external gear and an internal gear having external teeth and internal teeth, respectively, the difference in the number of teeth between which is slight. At least two of the plurality of mechanisms are disposed in parallel on a power transmission path, and the two mechanisms differ from each other in power transmission characteristics.

In the present invention, the phrase "disposed in parallel on a power transmission path" means that a plurality of power-transmissible routes through which power can be transmitted exist between shared members (same members). A plurality of completely independent routes do not necessarily need to exist between the input shaft and the output shaft. In this connection, the phrase "disposed in series on a power transmission path" means that power is transmitted through a route and, after that, is transmitted through another route.

The number of routes disposed in parallel may be three or more. If a design is made to create a difference in power transmission characteristics between at least two of the three or more routes, this is included in the scope of the present invention.

A structure formed by a difference in pitch circle diameter (gear size), tooth width, tooth thickness, module, tooth profile, hardness, surface roughness, sliding resistance (friction coefficient), or rotation supporting manner in each system can function as a concrete structure to make a difference in factors (for example, rotational resistance of a rotation system, rigidity, backlash, etc.) of power transmission characteristics mentioned in the present invention.

There is well known a power transmission device in which a plurality of internally meshing planetary gear mechanisms that are identical in power transmission characteristics are disposed in parallel in order to increase transmission capacity, and there is also well known a power transmission device in which a plurality of internally meshing planetary gear mechanisms that are different in power transmission characteristics are disposed in series in order to obtain a high reduction ratio.

In contrast, in the present invention, a plurality of internally meshing planetary gear mechanisms are disposed in parallel on a power transmission path and are designed to create a difference especially in power transmission characteristics in each system.

Accordingly, it becomes possible to automatically produce a situation in which only one of the plurality of internally meshing planetary gear mechanisms contributes to power transmission, or only the other one contributes to power transmission, or both of them contribute to power transmission in accordance with a driving situation on that occasion. Moreover, its change can be performed in a gradual manner. A concrete structure thereof will be described in detail later.

For example, in order to allow a self-locking function during stopping to coexist with rotational smoothness during operation, the possibility that the high self-locking function can be secured must be created depending on a design, and the possibility that high rotation efficiency can be achieved must be created depending on a design. The present invention adopts the internally meshing planetary gear mechanism, and therefore, can obtain a high reduction ratio by one stage and can obtain high rotation efficiency by reducing the frictional resistance of each sliding portion. On the other hand, a design can be prepared so that the high self-locking functionality can be obtained by raising the frictional resistance of each sliding portion or by lowering the rigidity of some materials. The characteristics of low noise and slight vibrations originally appear when a light load is applied, and backlash is also small. Especially, if a design is made so that each member can be easily deformed by positively lowering the rigidity as described later, a state where backlash is almost zero (0) can also be easily created. Since a design to enlarge backlash can be easily prepared, the backlash can be desirably and easily enlarged or reduced according to the design. Additionally, the mechanism has great design freedom to adjust the number of internal and external teeth meshing together that contribute to power transmission or a contact area between the internal and external contacting tooth surface, and the transmission capacity thereof can also be easily controlled and adjusted.

In the present invention, internally meshing planetary gear mechanisms are characterized by being high in basic performance, by being flexible in design, and by undergoing a marked change in the effects obtained with respect to a design change as described above, and are disposed in parallel on a path of power transmission. In the thus constructed mechanisms, predetermined functions are intentionally distributed by creating a difference in power transmission characteristics in each system. Therefore, a design can be made so that a specific system contributes to power transmission more positively when a predetermined condition is satisfied. As a result, conflicting requirements can coexist together rationally and effectively.

DETAILED DESCRIPTION OF THE PREFERRED EMBODIMENTS

Embodiments of the present invention will be hereinafter described with reference to the drawings.

Figure 1:
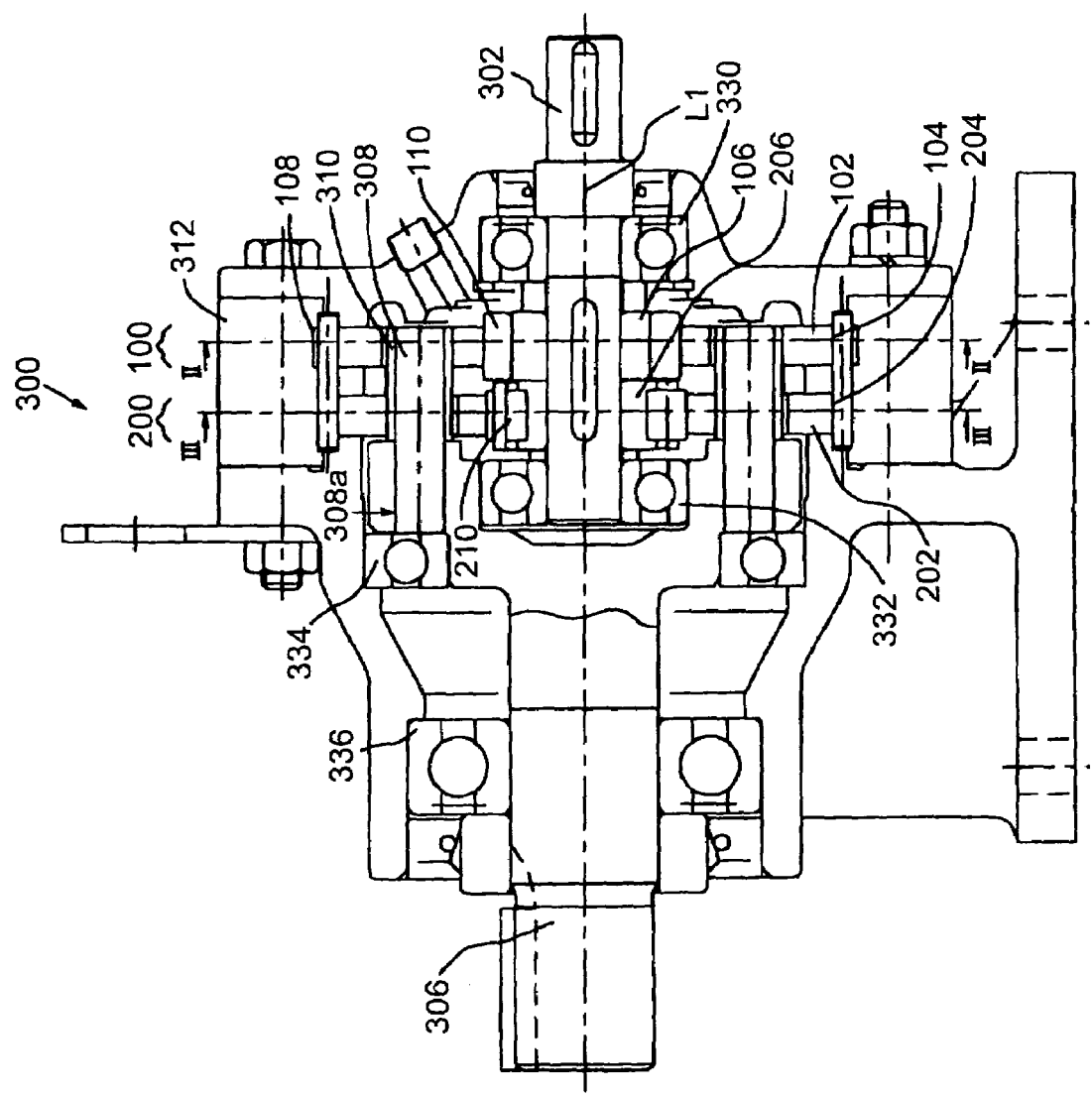
FIG. 1 is a sectional side view of the power transmission device according to an embodiment of the present invention.

FIG. 1 is a sectional side view of a power transmission device 300 according to an embodiment of the present invention.

The power transmission device 300 includes an input shaft 302, an output shaft 306, a first internally meshing planetary gear mechanism 100 which is a first power-transmitting mechanism, and a second internally meshing planetary gear mechanism 200 which is a second power-transmitting mechanism. The power transmission device 300 can transmit power inputted from the input shaft 302 to a mating apparatus (driven apparatus), not shown, through the first and second internally meshing planetary gear mechanisms 100 and 200 and the output shaft 306.

The input shaft 302 is rotatably supported at both its ends by bearings 330 and 332, and can rotate around an axial center L1.

The output shaft 306 is rotatably supported by bearings 334 and 336, and can rotate around the axial center L1 identical to that of the input shaft 302.

The first and second internally meshing planetary gear mechanisms 100 and 200, which have power transmission characteristics differing from each other, are disposed in parallel between the input shaft 302 and the output shaft 306.

The phrase "disposed in parallel on a path of power transmission" means that two power-transmissible paths are disposed between the input shaft 302 and the output shaft 306 each of which is the same member. For reference, the phrase "disposed in series on a path of power transmission" means that power is transmitted through a path, after that is transmitted through another path. For example, after a first reduction through a first path is performed, then a second reduction through a second path is performed so that 2 stage reductions are performed.

Figure 2:
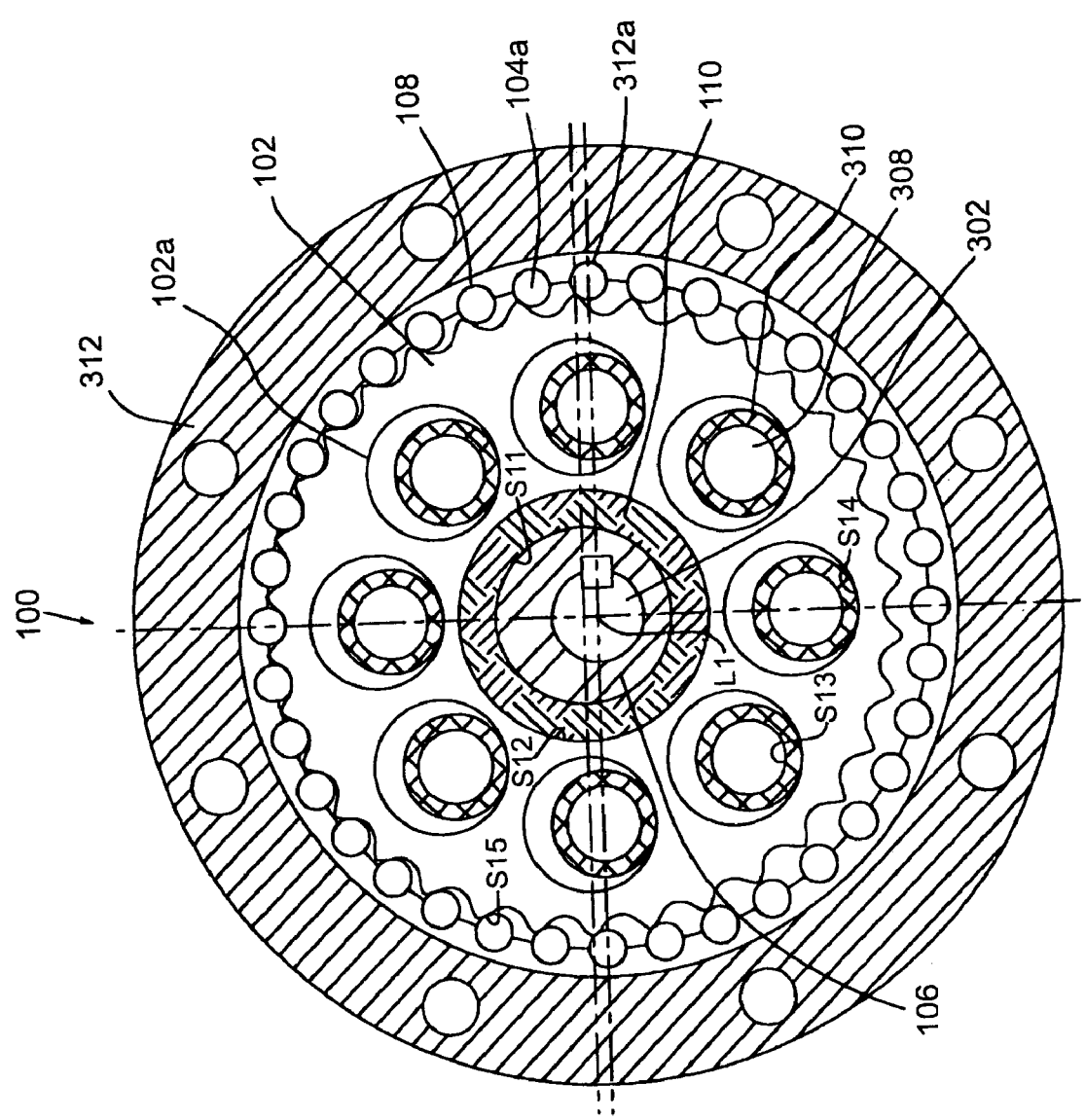
FIG. 2 is a sectional view along line II—II of FIG. 1.
Figure 3:
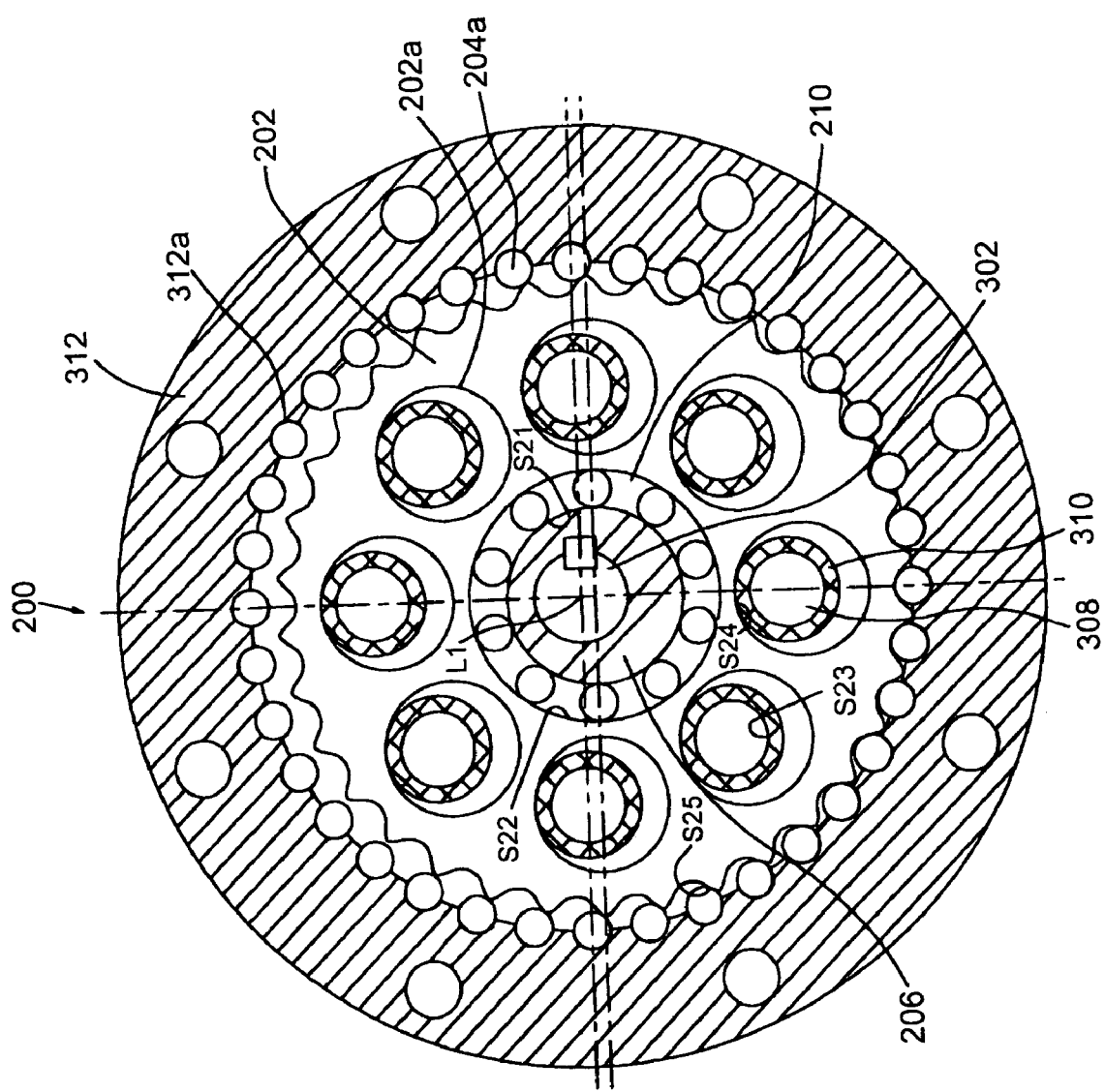
FIG. 3 is a sectional view along line III—III of FIG. 1.

FIG. 2 and FIG. 3 show the first internally meshing planetary gear mechanism 100 and the second internally meshing planetary gear mechanism 200, respectively. FIG. 2 is a sectional view along line II—II of FIG. 1, and FIG. 3 is a sectional view along line III—III of FIG. 1.

As shown in FIG. 1 and FIG. 2, the first internally meshing planetary gear mechanism 100 includes a first external gear 102 and a first internal gear 104 between which a difference in the number of teeth is slight, an eccentric body (oscillater) 106, and a sliding bearing (first slide-advancing member disposed on a sliding portion) 110.

The eccentric body 106 has an outer periphery that is eccentric with respect to the axial center L1. The eccentric body 106 is disposed on the outer periphery between the bearings 330 and 332 of the input shaft 302 with a predetermined phase difference (180 degrees in this embodiment) with respect to an eccentric body 206 of the second internally meshing planetary gear mechanism 200 described later.

The first internal gear 104 has a structure in which a cylindrical outer pin 104a is fitted to each of a plurality of circular arc grooves 312a formed in the inner peripheral surface of a casing 312. These outer pins 104a form the internal teeth. Ring-shaped grooves 108 are formed in the casing 312 in the outer-periphery direction of the first internal gear 104.

The first external gear 102 has external teeth of a trochoidal tooth profile or a circular arc tooth profile on the outer periphery, and internally meshes with the outer pins 104a of the first internal gear 104. The first external gear 102 is fitted to the eccentric body 106 through the sliding bearing 110 disposed between the first external gear 102 and the eccentric body 106, and can oscillate and rotate in response to the rotation of the eccentric body 106. Further, the first external gear 102 has a plurality of inner roller holes 102a. An inner pin 308 and an inner roller 310 that constitute a carrier pass through each of the roller holes 102a. One end 308a of the inner pin 308 is supported in a cantilever manner by the output shaft 306 as shown in FIG. 1.

On the other hand, as shown in FIG. 1 and FIG. 3, the second internally meshing planetary gear mechanism 200 includes a second external gear 202 and a second internal gear 204 between which a difference in the number of teeth is slight, an eccentric body 206, and a roller bearing (or a ball bearing: second slide-advancing member disposed on a sliding portion) 210.

The eccentric body 206 has an outer periphery that is eccentric with respect to the axial center L1. The eccentric body 206 is disposed on the outer periphery between the bearings 330 and 332 of the input shaft 302 with a predetermined phase difference with respect to the eccentric body 106 of the first internally meshing planetary gear mechanism 100.

The second internal gear 204 has a structure in which an outer pin 204a is fitted to each of the plurality of circular arc grooves 312a formed in the inner peripheral surface of the casing 312. These outer pins 204a form the internal teeth.

The second external gear 202 has external teeth of a trochoidal tooth profile or a circular arc tooth profile on the outer periphery, and internally meshes with the outer pins 204a of the second internal gear 204. The second external gear 202 is fitted to the eccentric body 206 through the roller bearing 210 disposed between the second external gear 202 and the eccentric body 206, and can oscillate and rotate in response to the rotation of the eccentric body 206. Further, the second external gear 202 has a plurality of inner roller holes 202a. The inner pin 308 and the inner roller 310 pass through each of the roller holes 204a.

As shown in FIG. 1, the inner pin 308 and the inner roller 310 pass through each of the roller holes 104a of the first external gear 102 and through each of the roller holes 202a of the second external gear 202. The rotational component of the first external gear 102 and the rotational component of the second external gear 202 can be transmitted to the output shaft 306 through the inner pin 308. The second external gear 202 is disposed on the side of the output shaft 306 from the first external gear 102, i.e., is disposed in the vicinity of one end 308a of the inner pin 308 supported in a cantilever manner by the output shaft 306.

A clearance S11 between the sliding bearing 110 and the eccentric body 106 in the first internally meshing planetary gear mechanism 100, a clearance S12 between the sliding bearing 110 and the first external gear 102, a clearance S13 between the inner pin 308 and the inner roller 310, a clearance S14 between the inner roller 310 and the first external gear 102, and a clearance S15 between the first external gear 102 and the first internal gear 104 are set to be smaller than a clearance S21 between the roller bearing 210 and the eccentric body 206 in the second internally meshing planetary gear mechanism 200, a clearance S22 between the roller bearing 210 and the second external gear 202, a clearance S23 between inner pin 308 and the inner roller 310, a clearance S24 between the inner roller 310 and the second external gear 202, and a clearance S25 between the second external gear 202 and the second internal gear 204, respectively (S11<S21, S12<S22, S13<S23, S14<S24, S15<S25). The large-and-small relationship among all the clearances is not necessarily established as above.

That is, the amount of backlashes of the first internally meshing planetary gear mechanism 100 with respect to the input shaft 302 and the output shaft 306 is smaller than that of the second internally meshing planetary gear mechanism 200.

In this embodiment, the shared (same) input shaft 302, the shared carrier (i.e., the inner pin 308 and the inner roller 310), and the shared output shaft 306 are provided, and two kinds of external and internal gears are prepared for one system (i.e., the first external gear 102 and the first internal gear 104) and for the other system (i.e., the second external gear 202 and the second internal gear 204), and these gears are disposed in parallel between the input shaft 302 and the carrier, thus forming the two characteristically-differentiated internally meshing planetary gear mechanisms disposed in parallel through the two kinds of slide-advancing members (110, 210).

Next, the operation of the power transmission device 300 will be described.

The eccentric bodies 106 and 206 provided on the outer periphery of the input shaft 302 rotate in response to rotation of the input shaft 302 around the axial center L1. The first and second external gears 102 and 202 also attempt to oscillate and rotate around the input shaft 302 in response to rotation of the eccentric bodies 106 and 206, but are restrained by the first and second internal gears 104 and 204 from rotating. Therefore, the first and second external gears 102 and 202 almost only oscillate while internally meshing with the first and second internal gears 104 and 204.

An oscillating component of the rotation of the first and second external gears is absorbed by the clearance between the inner roller holes 104a and 202a, and the inner pin 308 and the inner pin roller 310, and only a rotational component thereof is transmitted to a corresponding apparatus through the output shaft 306.

In the power transmission device 300 according to the aforementioned embodiment, the first internally meshing planetary gear mechanism 100 and the second internally meshing planetary gear mechanism 200, which are power-transmitting mechanisms having the same speed-change mechanism, are disposed in parallel, and a) rotational resistance, b) rigidity, and c) backlash of rotational members (rotation system) of the first and second external gears 102 and 202 or the first and second internal gears 104 and 204 in the respective power-transmitting mechanisms are regarded as elements of power transmission characteristics, and differences in the power transmission characteristics between the first internally meshing planetary gear mechanism 100 and the second internally meshing planetary gear mechanism 200 are created by making a difference in each implementation.

In greater detail, concerning "rotational resistance," the sliding bearing 110 (serving as a first slide-advancing member that is not very high in slide-advancing function) is disposed at the sliding portion of the eccentric body 106 and the first external gear 102 of the first internally meshing planetary gear mechanism 100, whereas the roller bearing 210 (serving as a second slide-advancing member that is high in slide-advancing function) is disposed at the sliding portion of the eccentric body 206 and the second external gear 202 of the second internally meshing planetary gear mechanism 200, thereby creating a difference in rotational resistance between the first internally meshing planetary gear mechanism 100 and the second internally meshing planetary gear mechanism 200. Since a difference in rotational resistance is created between the power-transmitting mechanisms in this way, the first internally meshing planetary gear mechanism 100 is characterized by being high in rotational resistance and being high in backstop ability, whereas the second internally meshing planetary gear mechanism 200 is characterized by being low in rotational resistance and being high in rotational smoothness.

Concerning "rigidity," the ring-shaped grooves 108 are formed in the casing 312 in the outer-periphery direction of the first internal gear 104 of the first internally meshing planetary gear mechanism 100, whereas the whole of the outer pins 204a is held directly by the plurality of circular arc grooves 312a formed in the inner peripheral surface of the casing 312 without forming the grooves in the outer-periphery direction of the second internal gear 204 of the second internally meshing planetary gear mechanism 200, thereby creating a difference in the rigidity of the rotation system between the first internally meshing planetary gear mechanism 100 and the second internally meshing planetary gear mechanism 200. In greater detail, when a force toward the casing 312 is applied to the outer pin 104a of the first internal gear 104, the outer pin 104a is flexible toward the casing 312 because of the ring-shaped grooves 108 formed in the casing 312, whereas the outer pin 204a of the second internal gear 204 is restrained from flexing toward the casing 312. Furthermore, the second external gear 202 is disposed on the side of the output shaft 306 from the first external gear 102, i.e., is disposed in the vicinity of one end 308a of the inner pin 308 supported in a cantilever manner by the output shaft 306, thereby creating a difference in rigidity between the first internally meshing planetary gear mechanism 100 and the second internally meshing planetary gear mechanism 200. Since a difference in rigidity is created between the respective power-transmitting mechanisms in this way, the first internally meshing planetary gear mechanism 100 is characterized by, as a whole, being large in the deformation amount of each member with respect to the transmitting torque (low in rigidity) and being low in power transmissibility (i.e., small in transmission capacity), whereas the second internally meshing planetary gear mechanism 200 is characterized by being, as a whole, being small in the deformation amount of each member with respect to the transmitting torque (high in rigidity) and being high in power transmissibility (i.e., large in transmission capacity).

Concerning "backlash," the clearance S11 between the sliding bearing 110 and the eccentric body 106 in the first internally meshing planetary gear mechanism 100, the clearance S12 between the sliding bearing 110 and the first external gear 102, the clearance S13 between the inner pin 310 and the inner roller 308, the clearance S14 between the inner roller 310 and the first external gear 102, and the clearance S15 between the first external gear 102 and the first internal gear 104 are set to be smaller than the clearance S21 between the roller bearing 210 and the eccentric body 206 in the second internally meshing planetary gear mechanism 200, the clearance S22 between the roller bearing 210 and the second external gear 202, the clearance S23 between the inner pin 308 and the inner roller 310, the clearance S24 between the inner roller 310 and the second external gear 202, and the clearance S25 between the second external gear 202 and the second internal gear 204, respectively, thereby creating a difference in backlash between the first internally meshing planetary gear mechanism 100 and the second internally meshing planetary gear mechanism 200. Since a difference in backlash is created between the respective power-transmitting mechanisms, the first internally meshing planetary gear mechanism 100 is characterized by being quick to react to the motion of the input shaft 302 (to reversal or variation of torque) and to the reversing torque from the side of the output shaft 306, whereas the second internally meshing planetary gear mechanism 200 is characterized by having a large backlash and being slow to react to both motions of the input shaft 302 and the output shaft 306 (to variation of torque).

Therefore, the power transmission device 300 has the first internally meshing planetary gear mechanism 100, which is a power-transmitting mechanism high in rotational resistance, low in rigidity, small in backlash, and focuses on self-locking functionality, and the second internally meshing planetary gear mechanism 200, which is a power-transmitting mechanism low in rotational resistance, high in rigidity, large in backlash, and focuses on rotational smoothness, being disposed in parallel with each other. As a result, immediately after the power transmission device 300 is activated, the first internally meshing planetary gear mechanism 100 having a small backlash with respect to the input shaft 302 is quick to react thereto and mainly transmits power. However, the first internally meshing planetary gear mechanism 100 is lower in rigidity than the second internally meshing planetary gear mechanism 200 and becomes unable to sustain a reaction force when the acting torque becomes greater, and therefore the second internally meshing planetary gear mechanism 200, which has higher rigidity, mainly transmits power at this time. The second internally meshing planetary gear mechanism 200 is low in rotational resistance and therefore can improve the rotation efficiency of the whole of the power transmission device 300.

When a rotational load in the opposite direction is applied from a corresponding apparatus, not shown, to the output shaft 306, the first internally meshing planetary gear mechanism 100, which has a small backlash with respect to the output shaft 306, is quick to react and receives a load mainly in the opposite direction. However, since the first internally meshing planetary gear mechanism 100 is high in rotational resistance, the power transmission device 300 has high self-locking functionality as the entire device. Since the torque applied from the side of the output shaft 306 is smaller than the torque generated when a normal operation is performed, a sufficient reaction force can be provided only by the first internally meshing planetary gear mechanism 100 which is low in rigidity.

Figure 4:
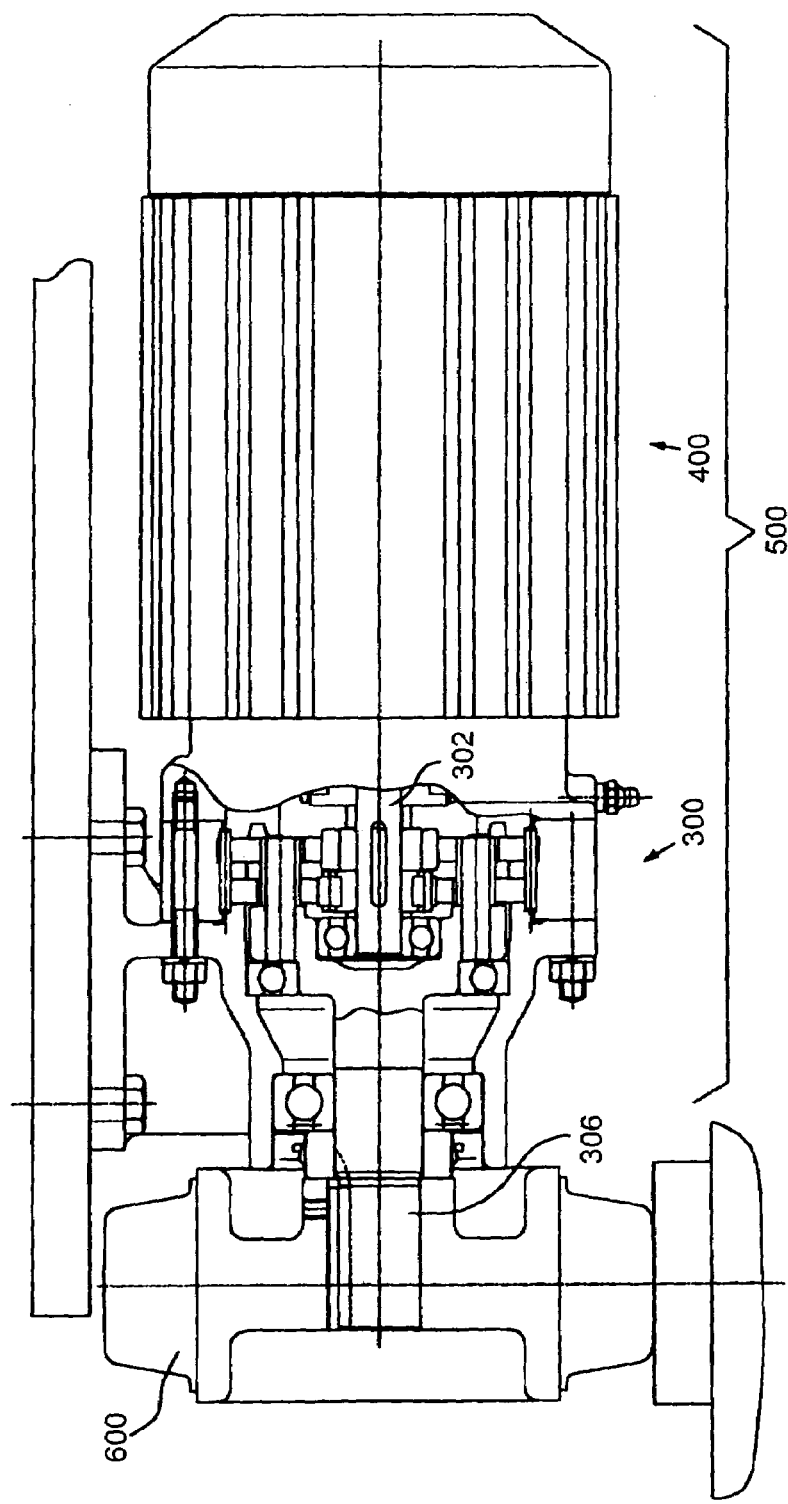
FIG. 4 is a view showing an embodiment in which the power transmission device according to the embodiment of the present invention is applied to the wheel driving of a traveling truck.

FIG. 4 is a view showing an embodiment in which a driving device 500 constructed by unitedly joining the power transmission device 300 to a motor 400 is applied to the driving of a wheel 600 of a traveling truck.

The driving device 500 including the power transmission device 300 has high self-locking functionality, and the wheel 600 of the traveling truck being stopped can be reliably prevented from starting to rotate because of the inclination of a traveling surface or because of an external force. Therefore, a device, such as a brake, that is used to stop the wheel 600 of the traveling truck is not needed, and cost reduction and size reduction can be achieved. Additionally, since this device has high rotational smoothness when a normal drive operation is performed, the motor 400 used to drive the power transmission device 300 can be reduced in size, and power consumption can be lessened.

Figure 6:
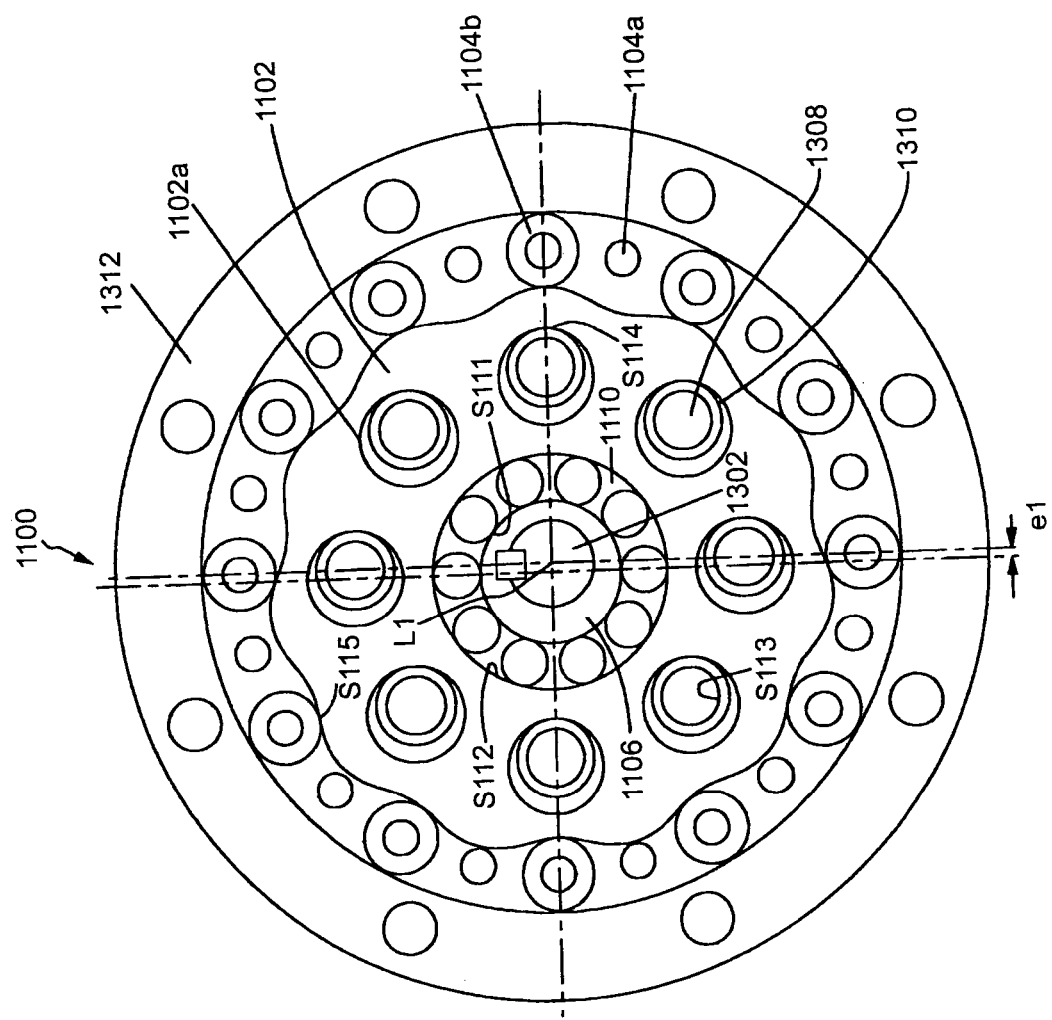
FIG. 6 is a sectional view along line VI—VI of FIG. 5.

FIG. 6 is a sectional side view of a power transmission device 1300 according to another embodiment of the present invention.

The power transmission device 1300 includes an input shaft 1302, an output shaft 1306, a first internally meshing planetary gear mechanism 1100, and a second internally meshing planetary gear mechanism 1200. The power transmission device 1300 can transmit power inputted from the input shaft 1302 to a corresponding apparatus, not shown, through the first and second internally meshing planetary gear mechanisms 1100 and 1200 and the output shaft 1306.

The input shaft 1302 is rotatably supported at both its ends by bearings 1330 and 1332, and can rotate around an axial center L1.

The output shaft 1306 is rotatably supported by bearings 1334 and 1336, and can rotate around the axial center L1 identical to that of the input shaft 1302.

The first and second internally meshing planetary gear mechanisms 1100 and 1200, which have power transmission characteristics differing from each other, are disposed in parallel between the input shaft 1302 and the output shaft 1306 on a path of power transmission.

Figure 7:
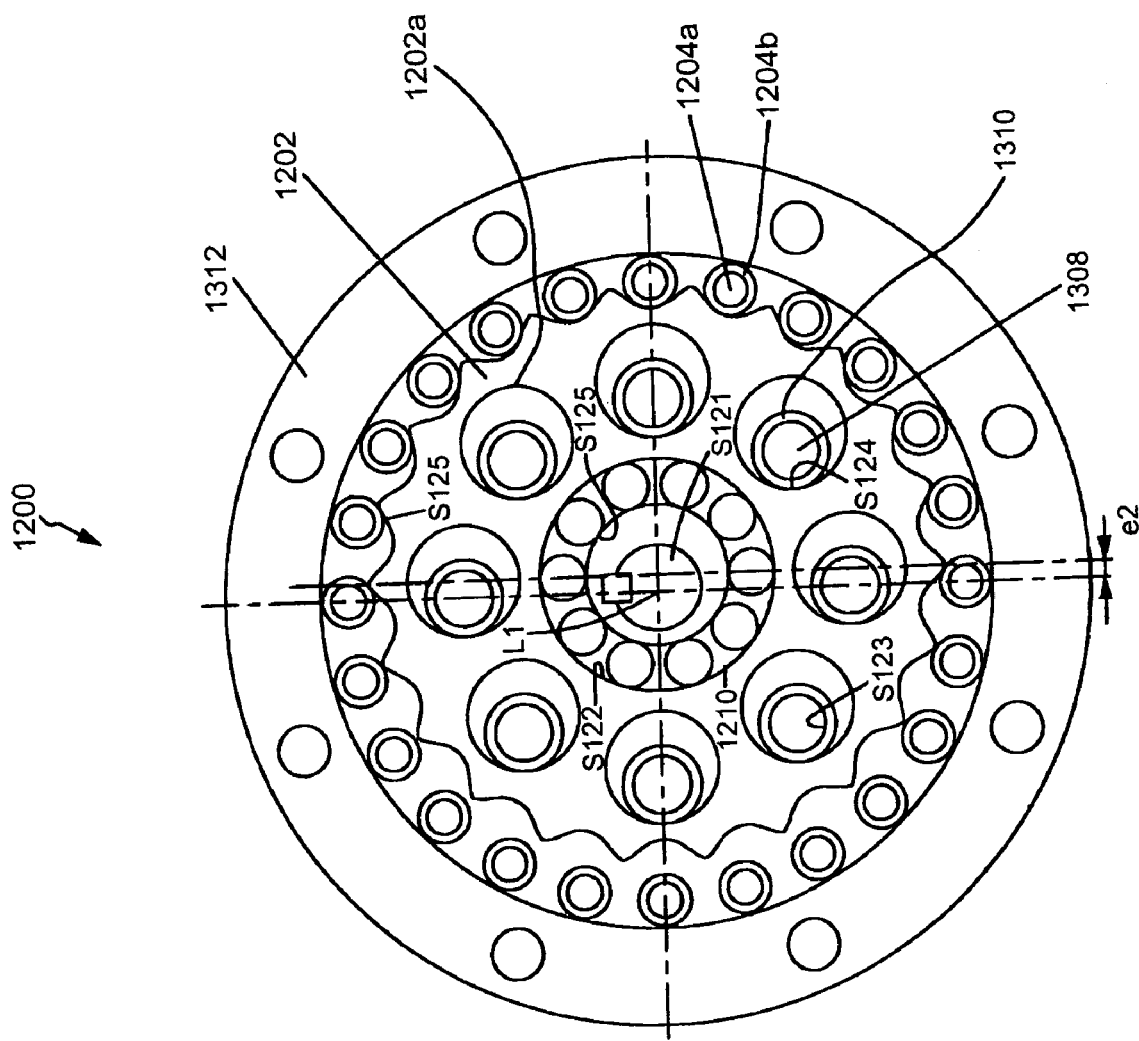
FIG. 7 is a sectional view along line VII–VIII of FIG. 5.

FIG. 6 and FIG. 7 show the first internally meshing planetary gear mechanism 1100 and the second internally meshing planetary gear mechanism 1200, respectively. FIG. 6 is a sectional view along line VI—VI of FIG. 5, and FIG. 7 is a sectional view along line VII—VII of FIG. 5.

Figure 5:
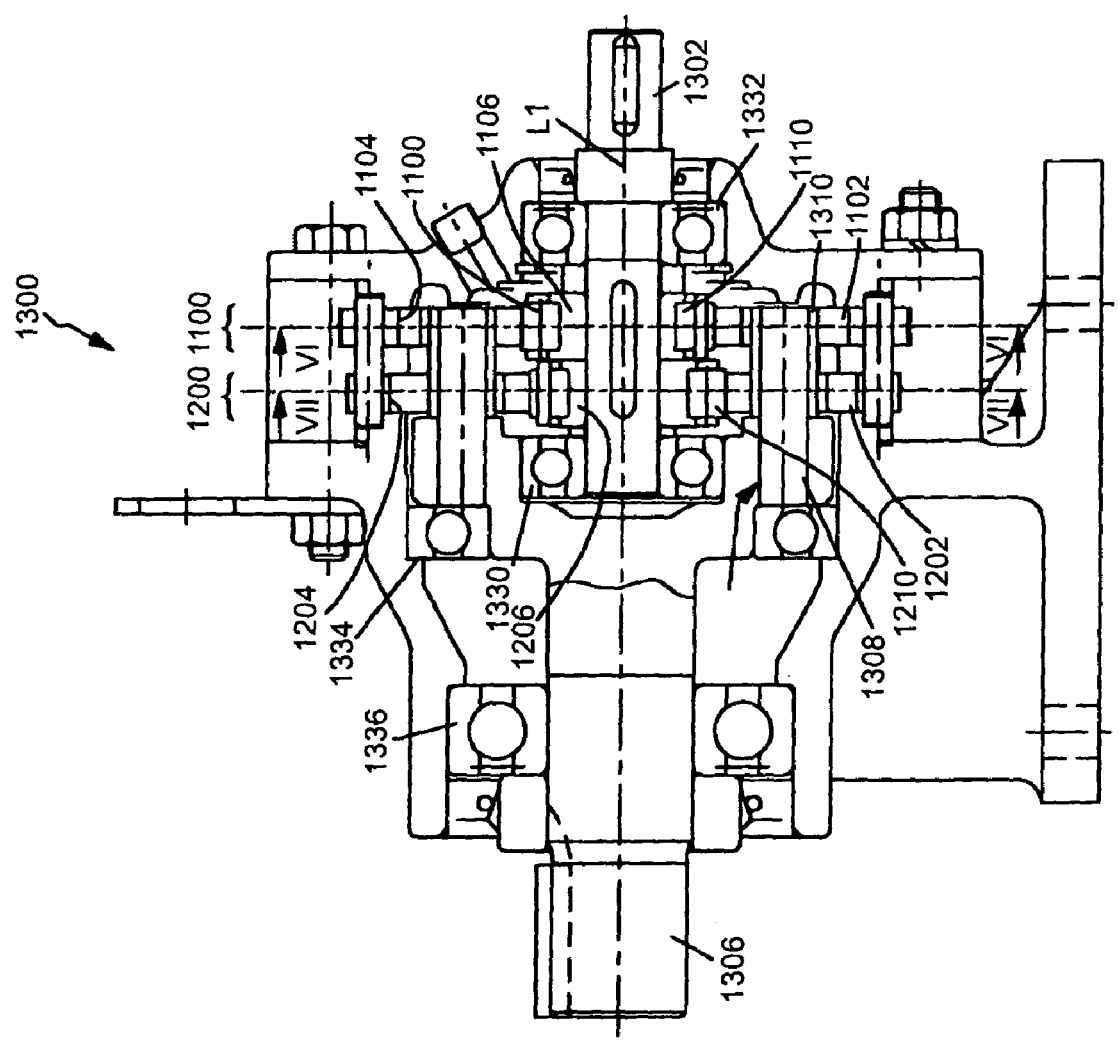
FIG. 5 is a sectional side view of the power transmission device according to another embodiment of the present invention.

As shown in FIG. 5 and FIG. 6, the first internally meshing planetary gear mechanism 1100 includes a first external gear 1102 and a first internal gear 1104 between which a difference in the number of teeth is slight, an eccentric body 1106, and a roller bearing 1110.

The eccentric body 1106 has an outer periphery that is eccentric by an amount of e1 with respect to the axial center L1 of the input shaft 1302. The eccentric body 1106 is disposed on the outer periphery between the bearings 1330 and 1332 of the input shaft 1302 with a predetermined phase difference (180 degrees in this embodiment) with respect to an eccentric body 1206 of the second internally meshing planetary gear mechanism 1200 described later.

The first internal gear 1104 has its main body (casing 1312) shared with a second internal gear 1204 described later. The internal teeth of the first internal gear 1104 have a structure in which an outer roller 1104b is fitted to each of a plurality of cylindrical outer pins 1104a formed on the side of the inner periphery of the casing 1312. These outer rollers 1104b substantially form the internal teeth of the first internal gear 1204. In this embodiment, the outer rollers 1104b (internal teeth) of twelve teeth are provided.

The first external gear 1102 has external teeth of a smooth trochoidal tooth profile on the outer periphery and is mounted inside the first internal gear 1104 so as to be eccentrically internally meshed and so as to be rotatable. The number of external teeth of the first external gear 1102 provided in this embodiment is eleven, and a difference in the number of teeth between the first internal gear 1104 and the first external gear 1102 is set at 1 (=12 (internal teeth)−11 (external teeth)).

The first external gear 1102 is fitted to the eccentric body 1106 through the roller bearing 1110 disposed between the first external gear 1102 and the eccentric body 1106, and can oscillate and rotate in response to the rotation of the eccentric body 1106. Further, the first external gear 1102 has a plurality of inner roller holes 1104a. An inner pin 1308 and an inner roller 1310 pass through each of the roller holes 1104a. One end 1308a of the inner pin 1308 is supported in a cantilever manner by the output shaft 1306 as shown in FIG. 5.

On the other hand, as shown in FIG. 5 and FIG. 7, the second internally meshing planetary gear mechanism 1200 includes a second external gear 1202 and the second internal gear 1204 between which a difference in the number of teeth is slight, an eccentric body 1206, and a roller bearing 1210.

The eccentric body 1206 has an outer periphery that is eccentric by an amount of e2 with respect to the axial center L1 of the input shaft 1302. The eccentric body 1206 is disposed on the outer periphery between the bearings 1330 and 1332 of the input shaft 1302 with a predetermined phase difference with respect to the eccentric body 1106 of the first internally meshing planetary gear mechanism 1100.

The second internal gear 1204 has its main body (casing 1312) shared with the first internal gear 1104. The internal teeth of the second internal gear 1204 have a structure in which an outer roller 1204b is fitted to each of a plurality of outer pins 1204a formed on the side of the inner periphery of the casing 1312. These outer rollers 1204b substantially form the internal teeth of the second internal gear 1204. In this embodiment, the outer rollers 1204b (internal teeth) of twenty-four teeth are provided.

The second external gear 1202 has external teeth of a trochoidal tooth profile on the outer periphery and is mounted inside the cylindrical outer roller 1204b of the second internal gear 1204 so as to be eccentrically internally meshed and so as to be rotatable. The number of external teeth of the first external gear 1202 provided in this embodiment is twenty-two, and a difference in the number of teeth between the second internal gear 1204 and the second external gear 1202 is set at 2 (=24 (internal teeth)−22 (external teeth)).

The second external gear 1202 is fitted to the eccentric body 1206 through the roller bearing 1210 disposed between the second external gear 1202 and the eccentric body 1206, and can oscillate and rotate in response to the rotation of the eccentric body 1206. Further, the second external gear 1202 has a plurality of inner roller holes 1204a. The inner pin 1308 and the inner roller 1310 pass through each of the roller holes 1204a.

As shown in FIG. 5, the inner pin 1308 and the inner roller 1310 pass through each of the roller holes 1102a of the first external gear 1102 and through each of the roller holes 1202a of the second external gear 1202. The rotational component of the first external gear 1102 and the rotational component of the second external gear 1202 can be transmitted to the output shaft 1306 through the inner pin 1308. The second external gear 1202 is disposed on the side of the output shaft 1306 from the first external gear 1102, i.e., is disposed in the vicinity of one end 1308a of the inner pin 1308 supported in a cantilever manner by the output shaft 1306.

A clearance S111 between the roller bearing 1110 and the eccentric body 1106 in the first internally meshing planetary gear mechanism 1100, a clearance S112 between the roller bearing 1110 and the first external gear 1102, a clearance S113 between the inner pin 1308 and the inner roller 1310, a clearance S114 between the inner roller 1310 and the first external gear 1102, and a clearance S115 between the first external gear 1102 and the first internal gear 1104 are set to be smaller than a clearance S121 between the roller bearing 1210 and the eccentric body 1206 in the second internally meshing planetary gear mechanism 1200, a clearance S122 between the roller bearing 1210 and the second external gear 1202, a clearance S123 between inner pin 1308 and the inner roller 1310, a clearance S124 between the inner roller 1310 and the second external gear 1202, and a clearance S125 between the second external gear 1202 and the second internal gear 1204, respectively (S111<S121, S112<S122, S113<S123, S114<S124, S115<S125). The large-and-small relationship among all the clearances is not necessarily established as above.

That is, the amount of backlashes of the first internally meshing planetary gear mechanism 1100 with respect to the input shaft 1302 and the output shaft 1306 is smaller than that of the second internally meshing planetary gear mechanism 1200.

Next, the operation of the power transmission device 1300 will be described.

The eccentric bodies 1106 and 1206 provided on the outer periphery of the input shaft 1302 rotate in response to rotation of the input shaft 1302 around the axial center L1. The first and second external gears 1102 and 1202 also attempt to oscillate and rotate around the input shaft 1302 in response to rotation of the eccentric bodies 1106 and 1206, but are restrained by the first and second internal gears 1104 and 1204 from rotating. Therefore, the first and second external gears 1102 and 1202 almost only oscillate while internally meshing with the first and second internal gears 1104 and 1204.

An oscillating component of the rotation of the first and second external gears is absorbed by the clearance between the inner roller holes 1104a and 1202a, and the inner pin 1308, and only a rotational component thereof is transmitted to a corresponding apparatus through the output shaft 1306.

In the power transmission device 1300 according to this embodiment of the present invention, a difference in the number of teeth between the first internal gear 1104 and the first external gear 1102 of the first internally meshing planetary gear mechanism 1100 is set at one, whereas a difference in the number of teeth between the second internal gear 1204 and the second external gear 1202 of the second internally meshing planetary gear mechanism 1200 is set at two so that a difference in the number of teeth occurs between the internal gear and the external gear of each mechanism, thereby creating a difference in power transmission characteristics between the first internally meshing planetary gear mechanism 1100 and the second internally meshing planetary gear mechanism 1200.

Furthermore, the number of teeth of the first internal gear 1104 of the first internally meshing planetary gear mechanism 1100 is set at twelve, and the number of teeth of the first external gear 1102 is set at eleven, whereas the number of teeth of the second internal gear 1204 of the second internally meshing planetary gear mechanism 1200 is set at twenty-four, and the number of teeth of the second external gear 1202 is set at twenty-two so that a difference in the number of teeth occurs between the internal gear and the external gear of each mechanism, thereby creating a difference in power transmission characteristics between the first internally meshing planetary gear mechanism 1100 and the second internally meshing planetary gear mechanism 1200. In other words, the number of external teeth of the first external gear 1202 differs from the number of external teeth of the second external gear 1102, and the number of internal teeth of the first internal gear 1204 and the number of internal teeth of the second internal gear 1104 are set to be equal to the number of teeth by which first and second systems can maintain the same change gear ratio (1/11).

Furthermore, the first external gear 1102 of the first internally meshing planetary gear mechanism 1100 has an amount of eccentricity of e1 with respect to the input shaft 1302, whereas the second external gear 1202 of the second internally meshing planetary gear mechanism 1200 has an amount of eccentricity of e2 with respect to the input shaft 1302 so that a difference in the amount of eccentricity with respect to the input shaft 1302 occurs between the external gears of the mechanisms, thereby creating a difference in power transmission characteristics between the first internally meshing planetary gear mechanism 1100 and the second internally meshing planetary gear mechanism 1200.

In greater detail, in the first internally meshing planetary gear mechanism 1100, since a difference in the number of teeth between the first internal gear 1104 and the first external gear 1102 is set at one, the tooth profile of the first external gear 1102 takes a continuous trochoidal tooth profile, and the first internal gear 1104 and the first external gear 1102 can come into contact together on the entire periphery. Furthermore, since the amount of eccentricity of e1 of the first external gear 1102 is set to be smaller than the amount of eccentricity of e2 of the second external gear 1202, the tooth profile of the first external gear 1102 takes a gentle curve, and the first internal gear 1104 and the first external gear 1102 can very stably mesh together.

Therefore, for example, because of an increase in the contact time of the gears, the first internally meshing planetary gear mechanism 1100 can greatly reduce noise and vibrations occurring when driven.

Furthermore, since the number of teeth of the first internal gear 1104 and that of the first external gear 1102 are lessened, the number of teeth used for engagement between the first internal gear 1104 and the first external gear 1102 is small, and, since the operating pitch circle diameter is small, each member has a large deformation amount (low rigidity) to the transmitting torque as a whole.

On the other hand, in the second internally meshing planetary gear mechanism 1200, since a difference in the number of teeth between the second internal gear 1204 and the second external gear 1202 is set at two, the number of teeth for effective engagement between the second internal gear 1204 and the second external gear 1202 is raised. Therefore, a greater transmission capacity can be obtained than in the first internally meshing planetary gear mechanism 1100, and each member has a small deformation amount (high rigidity) to the transmitting torque as a whole.

The second external gear 1202 of the second internally meshing planetary gear mechanism 1200 is disposed on the side of the output shaft 1306 from the first external gear 1102, i.e., is disposed in the vicinity of one end 1308a of the inner pin 1308 supported in a cantilever manner by the output shaft 1306. Therefore, also in this respect, the second internally meshing planetary gear mechanism 1200 is higher in rigidity than the first internally meshing planetary gear mechanism 1100.

In the power transmission device 1300, the clearance Sill between the roller bearing 1110 and the eccentric body 1106 in the first internally meshing planetary gear mechanism 1100, the clearance S112 between the roller bearing 1110 and the first external gear 1102, the clearance S113 between the inner pin 1308 and the inner roller 1310, the clearance S114 between the inner roller 1310 and the first external gear 1102, and the clearance S115 between the first external gear 1102 and the first internal gear 1104 are set to be smaller than the clearance S121 between the roller bearing 1210 and the eccentric body 1206 in the second internally meshing planetary gear mechanism 1200, the clearance S122 between the roller bearing 1210 and the second external gear 1202, the clearance S123 between the inner pin 1308 and the inner roller 1310, the clearance S124 between the inner roller 1310 and the second external gear 1202, and the clearance S125 between the second external gear 1202 and the second internal gear 1204, respectively, thereby creating a difference in backlash between the first internally meshing planetary gear mechanism 1100 and the second internally meshing planetary gear mechanism 1200.

Since a difference in backlash is created between the first and second internally meshing planetary gear mechanisms 1100 and 1200, the first internally meshing planetary gear mechanism 1100 is characterized by being quick to react to the motion of the input shaft 1302 (to reversal or variation of torque) and to the reversing torque from the side of the output shaft 1306, whereas the second internally meshing planetary gear mechanism 1200 is characterized by having a large backlash and being slow to react to both motions of the input shaft 1302 and the output shaft 1306.

Therefore, the power transmission device 1300 has the first internally meshing planetary gear mechanism 1100, which has low rigidity, small noise, slight vibrations, and small backlashes, and the second internally meshing planetary gear mechanism 1200, which has high rotation efficiency, high rigidity (i.e., large transmission capacity), and large backlashes, being disposed in parallel on the path of power transmission. As a result, immediately after the power transmission device 1300 is activated, the first internally meshing planetary gear mechanism 1100 having small backlashes with respect to the input shaft 1302 is quick to react thereto and transmits power. After that, if the acting torque becomes greater so that torque needed for power transmission cannot be generated, the second internally meshing planetary gear mechanism 1200 also starts to operate while being deformed.

When an intermediate load or a heavy load is applied, e.g., for acceleration in which the acting torque is large, the second internally meshing planetary gear mechanism 1200 is also used for power transmission, and therefore the transmission capacity can be increased. Moreover, since the second internally meshing planetary gear mechanism 1200 has higher rotation efficiency than the first internally meshing planetary gear mechanism 1100, the rotation efficiency of the entire power-transmission device can be raised.

In contrast, when no load or a light load is applied while using the small acting torque, the first internally meshing planetary gear mechanism 1100 is mainly used for power transmission, or the second internally meshing planetary gear mechanism 1200 does not work, and therefore power can be transmitted with low noise and slight vibrations.

In the aforementioned embodiment, a difference in the number of teeth between the second external gear 1202 and the second internal gear 1204 of the second internally meshing planetary gear mechanism 1200 is set at two. However, the present invention is not limited to this.

Figure 8:
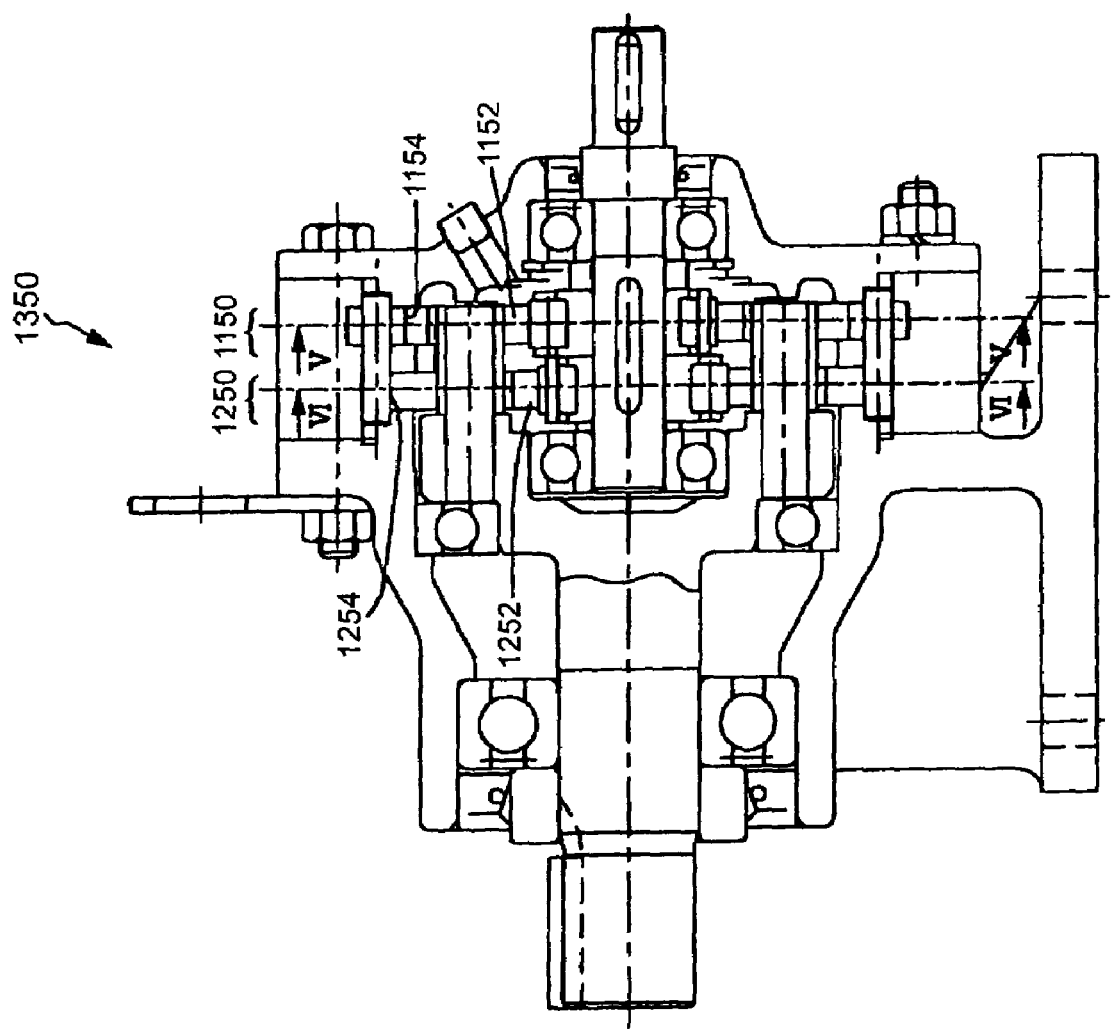
FIG. 8 is a sectional side view of the power transmission device according to still another embodiment of the present invention.
Figure 9:
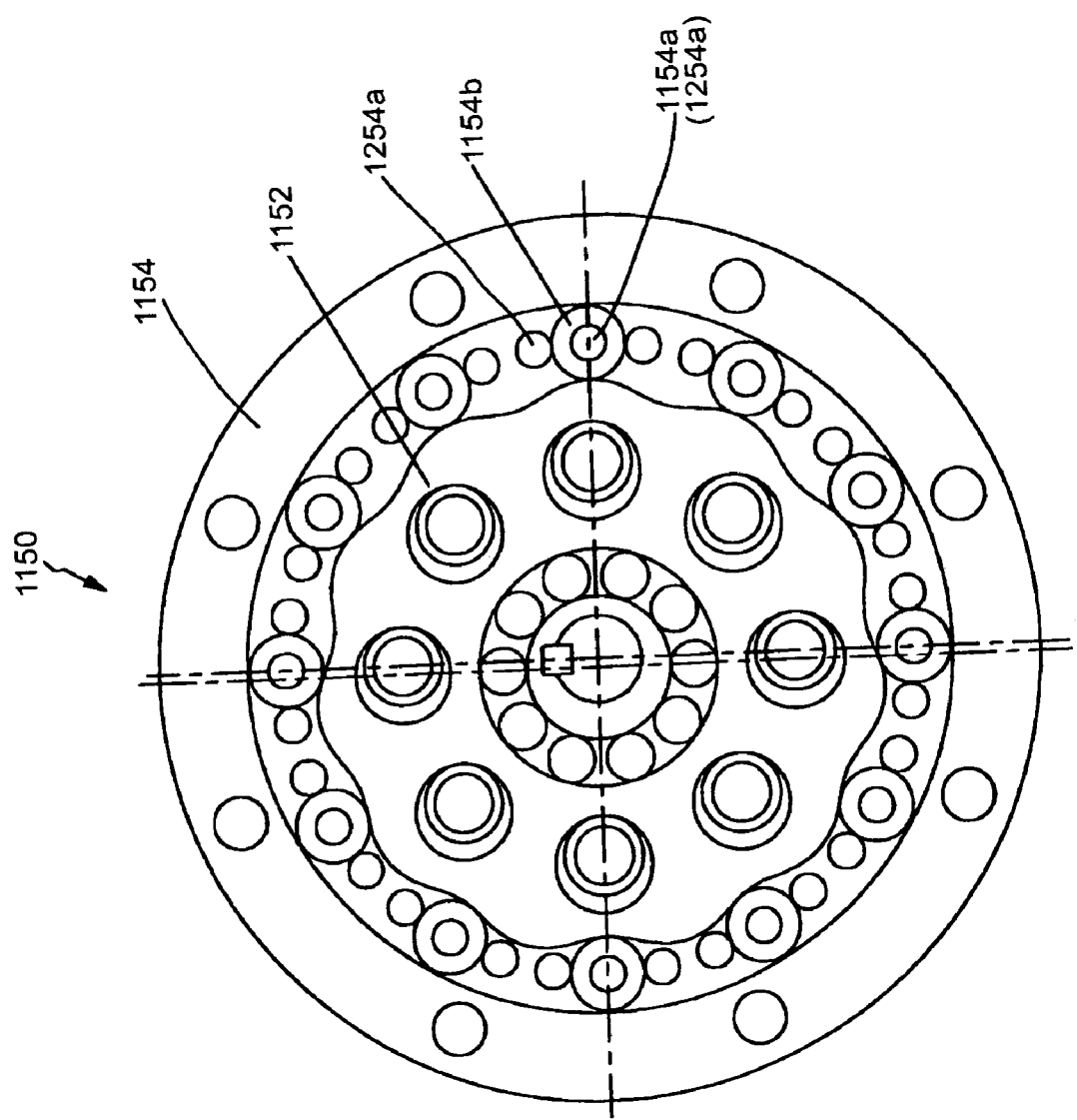
FIG. 9 is a sectional view along line IX—IX of FIG. 8.
Figure 10:
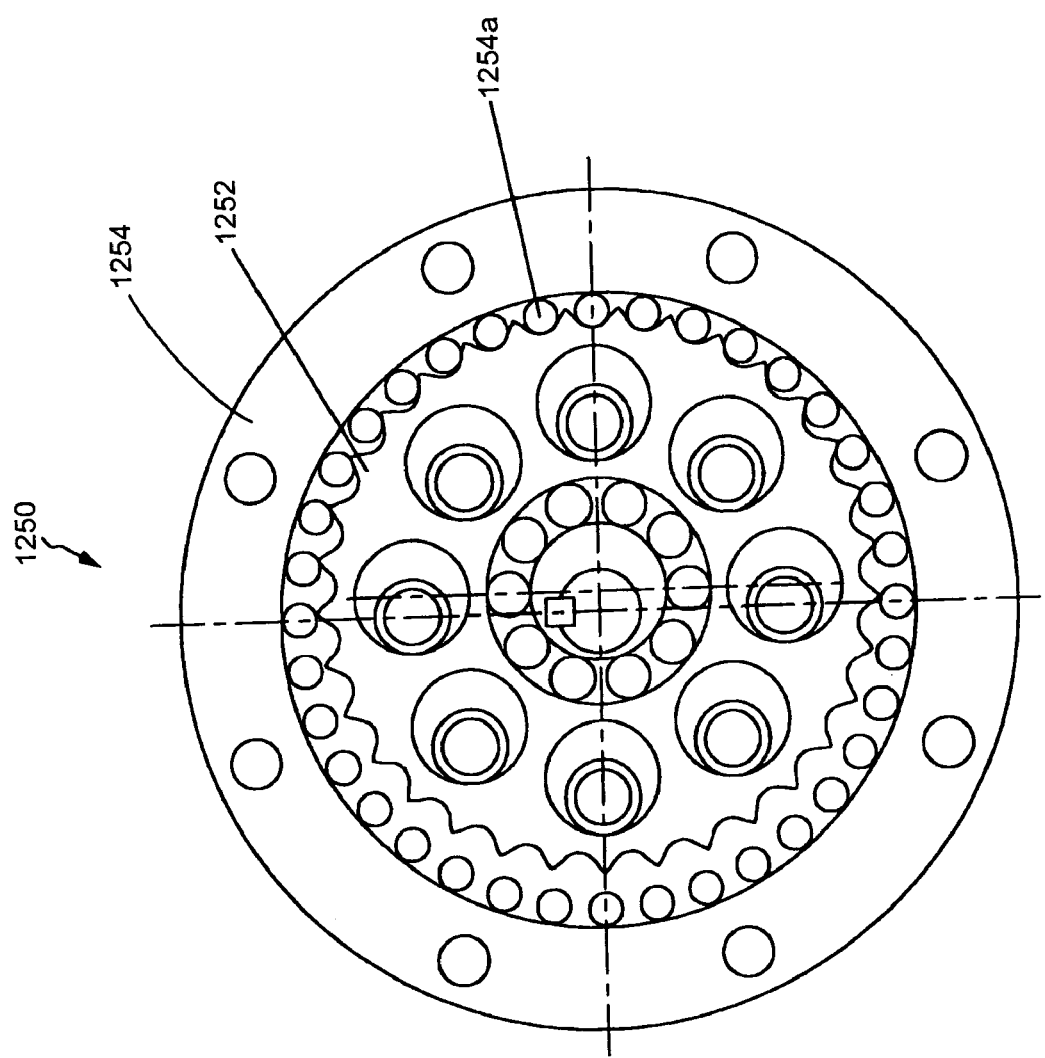
FIG. 10 is a sectional view along line X—X of FIG. 8.

For example, FIG. 8 is a sectional side view of another power transmission device 1350 corresponding to FIG. 5. FIG. 9 is a sectional view along line IX—IX of FIG. 6, and FIG. 10 is a sectional view along line X—X of FIG. 7. In this power transmission device 1350, the respective internal teeth of the internal gears 1154 and 1254 of first and second mechanisms 1150 and 1250 are structured on the basis of outer pins 1254a identical in number and in diameter in each system. Among these pins, outer rollers 1154b are provided only for the outer pins (designated as 1154a, for convenience of explanation) that constitute one of the systems. Accordingly, the number of teeth of the internal teeth of the first mechanism 1150 is set to be equal to the number of the outer pins 1154a where the outer rollers 1154b are provided, and the number of teeth (including the outer pins 1154a) of the internal teeth of the second mechanism 1250 is set to be equal to the number of all the outer pins 1254a.

As shown in FIG. 8 through FIG. 10, the power transmission device 1350 may include the first internally meshing planetary gear mechanism 1150 in which a difference in the number of teeth between the first internal gear 1154 and the first external gear 1152 is set at 1 (=12 (internal teeth)−11 (external teeth)) and the second internally meshing planetary gear mechanism 1250 in which a difference in the number of teeth between the second internal gear 1254 and the second external gear 1252 is set at 3 (=36 (internal teeth)−33 (external teeth)), the mechanisms being disposed in parallel on a path of power transmission.

In other words, a method for determinating a difference in the number of teeth between gears of the two mechanisms is not limited to that of the aforementioned embodiment. For example, a difference in the number of teeth between the gears of one of the internally meshing planetary gear mechanisms may be set at one, while a difference in the number of teeth between the gears of the other one may be set at two or more. Alternatively, a difference therebetween of one of the mechanisms may be set at two, whereas a difference therebetween of the other one may be set at three. Preferably, a difference in the number of teeth between the gears of the one mechanism that is lower in rigidity than the other mechanism, should set to be smaller. A rotational resistance should be determined according to application.

Figure 11:
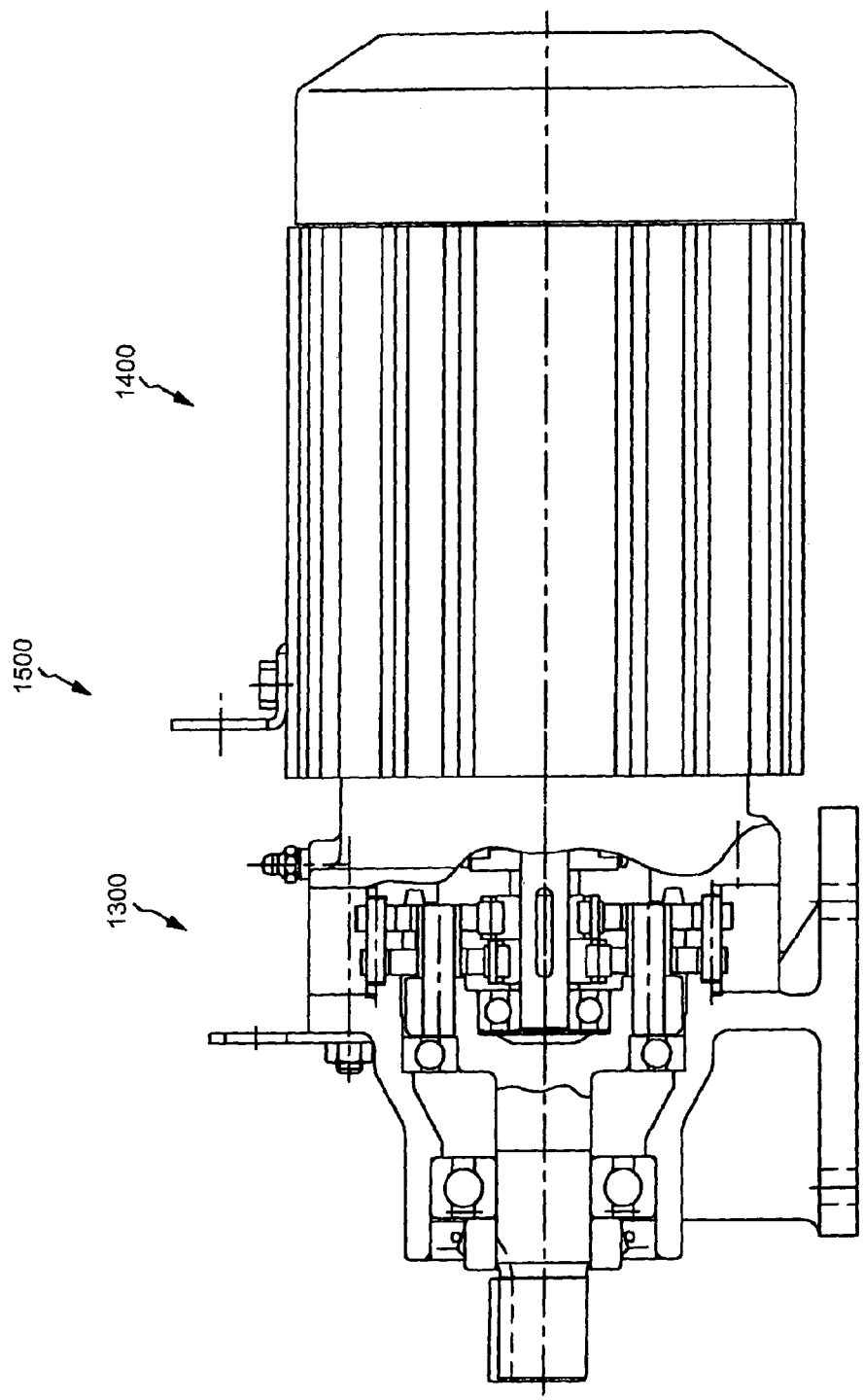
FIG. 11 is a sectional side view of a geared motor to which the power transmission device according to still another embodiment of the present invention is applied.

Additionally, if a geared motor 1500 shown in FIG. 11 is constructed by attaching and uniting a motor 1400 into the power transmission device 1300, the device can be reduced in size and in space requirements, and, concurrently, it is possible to provide a geared motor 1500 capable of appropriately controlling an increase in transmission capacity or a reduction in noise and vibrations in accordance with a load imposed by a driven apparatus.

Additionally, in the aforementioned embodiment, a difference in power transmission characteristics between the first and second mechanisms 1100 and 1200 is created by, for example, a difference in the number of teeth between the external gear and the internal gear. However, without being limited to this, a power transmission device in which the power transmission characteristics of the first internally meshing planetary gear mechanism 1100 differ from those of the second internally meshing planetary gear mechanism 1200 may be constructed by allowing all or part of the material of the first internally meshing planetary gear mechanism 1100 to differ from all or part of the material of the second internally meshing planetary gear mechanism 1200 and by making Young's modulus of one of the mechanisms smaller than Young's modulus of the other one (i.e., by lessening rigidity).

Figure 12:
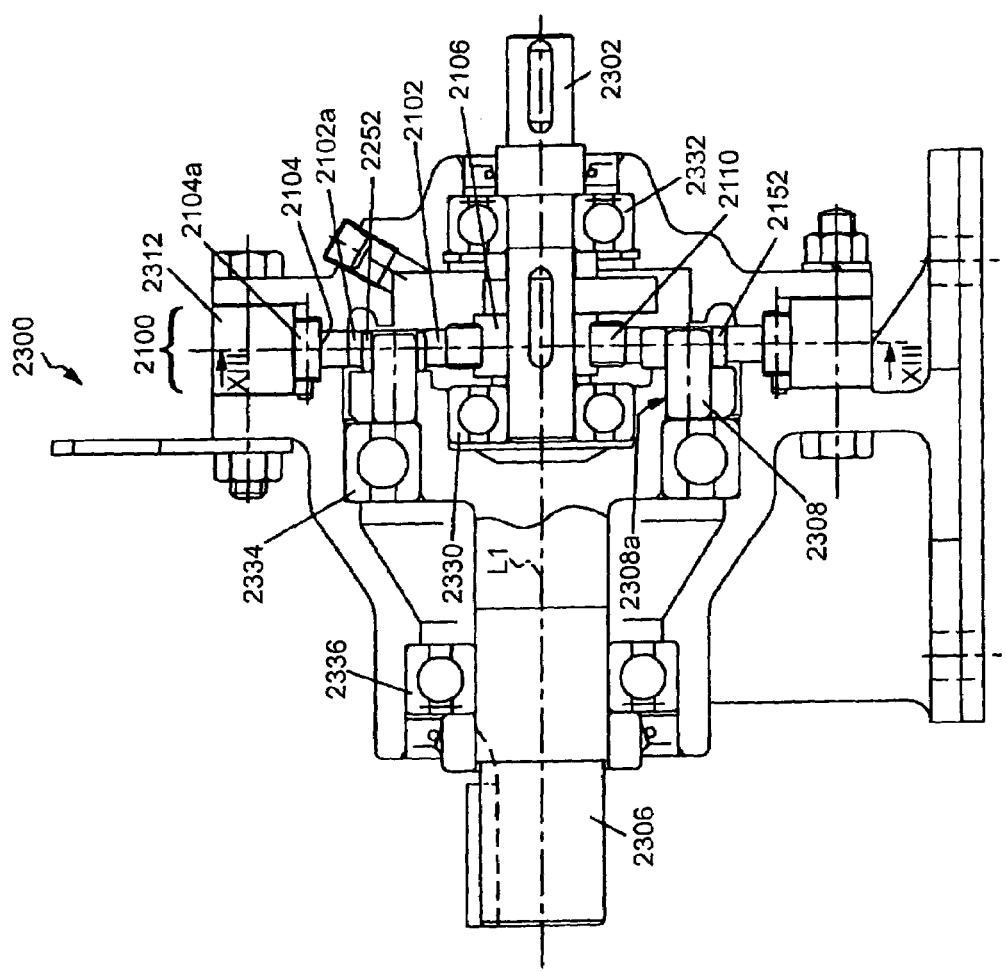
FIG. 12 is a sectional side view of the power transmission device according to still another embodiment of the present invention.

FIG. 12 is a sectional side view of a power transmission device 2300 according to still another embodiment of the present invention.

The power transmission device 2300 includes an input shaft 2302, an output shaft 2306, and an internally meshing planetary gear mechanism 2100. The power transmission device 2300 can transmit power inputted from the input shaft 2302 to a corresponding apparatus, not shown, through the internally meshing planetary gear mechanisms 2100 and the output shaft 2306.

The input shaft 2302 is rotatably supported at both its ends by bearings 2330 and 2332, and can rotate around an axial center L1.

The output shaft 2306 is rotatably supported by bearings 2334 and 2336, and can rotate around the axial center L1 identical to that of the input shaft 2302.

The internally meshing planetary gear mechanism 2100 is disposed between the input shaft 2302 and the output shaft 2306.

Figure 13:
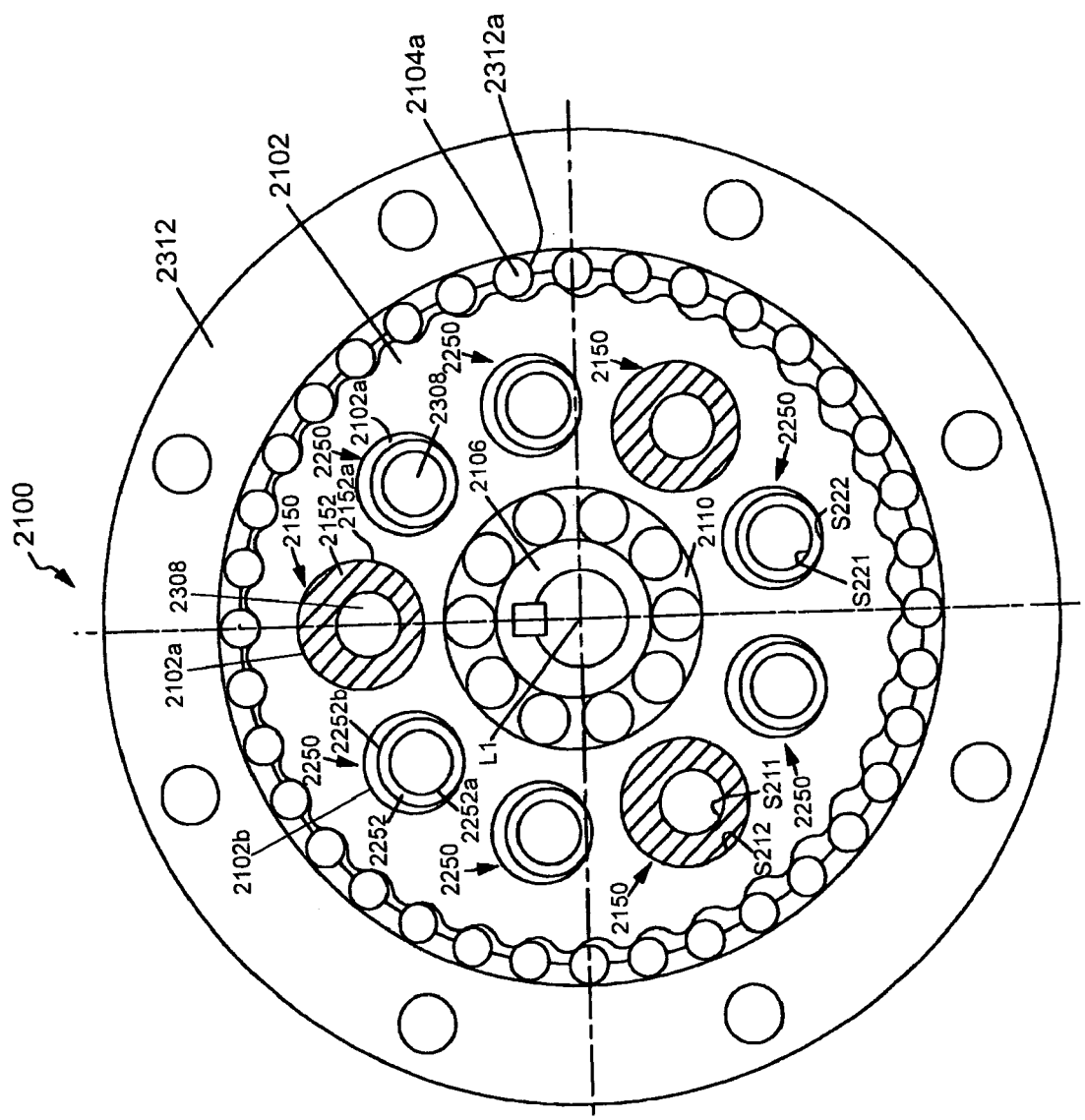
FIG. 13 is a sectional view along line XIII—XIII of FIG. 12.

FIG. 13 is a sectional view along line XIII—XIII of FIG. 12, showing a cross section of the internally meshing planetary gear mechanism 2100.

As shown in FIG. 12 and FIG. 13, the internally meshing planetary gear mechanism 2100 includes an internal gear 2104, an external gear 2102 having teeth the number of which is slightly different from the number of teeth of the internal gear 2104, an eccentric body 2106, and a roller bearing 2110.

The eccentric body 2106 has an outer periphery that is eccentric with respect to the axial center L1 of the input shaft 2302. The eccentric body 2106 is disposed on the outer periphery of the input shaft 2302 between the bearings 2330 and 2332.

The internal gear 2104 has a structure in which a cylindrical outer pin 2104a is fitted to each of a plurality of circular arc grooves 2312a formed in the inner peripheral surface of a casing 2312. These outer pins 2104a form the internal teeth.

The external gear 2102 has external teeth of a trochoidal tooth profile or a circular arc tooth profile on the outer periphery, and internally meshes with the outer pins 2104a of the internal gear 2104. The external gear 2102 is fitted to the eccentric body 2106 through the roller bearing 2110 disposed between the external gear 2102 and the eccentric body 2106, and can oscillate and rotate in response to the rotation of the eccentric body 2106. The external gear 2102 further has a plurality of first inner pin holes 2104a (in this embodiment, three) and a plurality of second inner pin holes 2102b (in this embodiment, six). Inner pins 2308 (same in diameter) that constitute a carrier are loosely fitted to the first and second inner pin holes 2102a and 2102b through first inner rollers 2152 or through second inner rollers 2252.

As shown in FIG. 12, one end 2308a of the inner pin 2308 is supported in a cantilever manner by the output shaft 2306, and a rotational component of the external gear 2102 can be transmitted to the output shaft 2306 through the inner pin 2308.

The first inner roller 2152 and the second inner roller 2252, each serving as a slide-advancing member, are disposed on a first sliding portion 2150 between the inner pin 2308 and the first inner pin hole 2102a and on a second sliding portion 2250 between the inner pin 2308 and the second inner pin hole 2102b, respectively. In this embodiment, the first inner roller 2152 is disposed at three places of the first sliding portion 2150, and the second inner roller 2252 is disposed at six places of the second sliding portion 2250.

The first inner roller 2152 is a substantially cylindrical member having an outer peripheral surface 2152a that is eccentric with respect to the inner pin 2308, and is fitted to the inner pin 2308 while being in internal contact with the first inner pin hole 2102a on the entire outer peripheral surface 2152a. The first inner roller 2152 is made of a material that is lower in elastic coefficient than the second inner roller 2252. In this embodiment, engineering plastics, such as polyacetal, are used as the material.

On the other hand, the second inner roller 2252 is a substantially cylindrical member having its inner peripheral surface 2252a coaxial with its outer peripheral surface 2252b, and is fitted to the inner pin 2308 while being in internal contact with the second inner pin hole 2102b in a part of the outer peripheral surface 2252b. The second inner roller 2252 is made of a material that is higher in elastic coefficient than the first inner roller 2152. In this embodiment, bearing steels are used as the material.

As a result, this power transmission device 2300 appears to have a one-system path of power transmission at first sight, but, in fact, has a first path of power transmission having the route of input shaft 2302→eccentric body 2106→external gear 2102→first sliding portion 2150 (first inner pin hole 2102a and first inner roller 2152)→inner pin 2308→output shaft 2306 and a second path of power transmission having the route of input shaft 2302→eccentric body 2106→external gear 2102→second sliding portion 2250 (second inner pin hole 2102b and second inner roller 2252)→inner pin 2308→output shaft 2306, in which the paths are disposed in parallel.

In other words, the power transmission device 2300 has the shared input shaft 2302, the shared external gear 2102, the shared internal gear 2104, the shared inner pin (carrier) 2308, and the shared output shaft 2306. In this power transmission device 2300, two kinds of inner pin holes, i.e., the first inner pin hole 2102a used for one of the two systems (i.e., one of the two paths) and the second inner pin hole 2102b used for the other system are prepared for the shared external gear 2102, and two kinds of inner rollers, i.e., an inner roller (first inner roller 2152) used for one of the systems and an inner roller (second inner roller 2252) used for the other system are disposed as slide-advancing members. In the thus constructed power transmission device 2300, switching is performed between a case in which the external gear 2102 and the inner pin 2308 (carrier) serve for one of the systems and a case in which they serve for the other system, depending on a substantial power-transmissible state created by one of the inner rollers (first inner roller 2152 or second inner roller 2252) and one of the inner pin holes (first inner pin hole 2102*a* or second inner pin hole 2102*b*) when driven (described later).

A clearance S211 between the first inner roller 2152 and the inner pin 2308 on the first sliding portion 2150 and a clearance S212 between the first inner roller 2152 and the inner pin hole 2102*a* are set to be smaller than a clearance S221 between the second inner roller 2252 and the inner pin 2308 on the second sliding portion 2250 and a clearance S222 between the second inner roller 2252 and the inner pin hole 2104*a*, respectively (S211<S221, S212<S222). It is to be noted that the large-and-small relationship among all the clearances is not necessarily established exactly as above.

That is, the amount of backlashes of the first sliding portion 2150 with respect to the input shaft 2302 and the output shaft 2306 is smaller than that of the second sliding portion 2250.

Next, the operation of the power transmission device 2300 will be described.

The eccentric body 2106 provided on the outer periphery of the input shaft 2302 rotates in response to rotation of the input shaft 2302 around the axial center L1. The external gear 2102 also attempts to oscillate and rotate around the input shaft 2302 in response to the rotation of the eccentric body 2106, but is restrained by the internal gear 2104 from rotating. Therefore, the external gear 2102 almost only oscillates while internally meshing with the internal gear 2104.

An oscillating component of the rotation of the external gear 2102 is absorbed by the first and second inner pin holes 2102*a* and 2102*b*, the first and second inner rollers 2152 and 2252, and the inner pin 2308, and only a rotational component thereof is transmitted to a corresponding apparatus through the output shaft 2306.

In the power transmission device 2300 in this embodiment, power inputted into the power transmission device 2300 can be transmitted to the corresponding apparatus through power transmission portions in which power transmission characteristics are caused to differ from each other by making a difference in the sliding manner between the first and second sliding portions 2150 and 2250, and the characteristics of the entire power transmission device 2300 can be changed by the respective characteristics of the power transmission portions to be combined.

In greater detail, the power transmission device 2300 includes the first inner roller 2152 serving as a slide-advancing member that is fitted to the inner pin 2308 and that can come into internal contact with the first inner pin hole 2102*a* on its own entire outer peripheral surface 2152*a* and the second inner roller 2252 serving as a slide-advancing member that is fitted to the inner pin 2308, that has its inner peripheral surface 2252*a* coaxial with its outer peripheral surface 2252*b*, and that can come into internal contact with the second inner pin hole 2102*b* on a part of the outer peripheral surface 2252*b*. In this power transmission device 2300, a difference in the sliding manner between the first and second sliding portions 2150 and 2250 is created by disposing the first inner roller 2152 on the first sliding portion 2150 and by disposing the second inner roller 2252 on the second sliding portion 2250.

In other words, since the first inner roller 2152 of the first sliding portion 2150 is in internal contact with the first inner pin hole 2102*a* on its entire outer peripheral surface 2152*a*, rotational resistance becomes large, and power transmission efficiency becomes small. However, since the meshing position between the internal gear 2104 and the external gear 2102 is restricted and since the contact area between the first inner roller 2152 and the first inner pin hole 2102*a* is large so that the roller can stably slide, noise and vibrations occurring when driven can be greatly reduced. On the other hand, the second inner roller 2252 of the second sliding portion 2250 is in internal contact with the second inner pin hole 2102*b* only on a part of its own outer peripheral surface 2252*b*, and the contact area between the second inner roller 2252 and the second inner pin hole 2102*b* is small. Therefore, the second inner roller 2252 is lower in rotational resistance (i.e., higher in rotation efficiency) than the first inner roller 2152 of the first sliding portion 2150, thus making it possible to increase transmission efficiency.

Additionally, the first inner roller 2152 is made of a material that is lower in elastic coefficient than the second inner roller 2252, and a difference in the sliding manner between the first and second sliding portions 2150 and 2250 is made also by changing the material of the first inner roller 2152 and the material of the second inner roller 2252.

Since a difference in the material between the first inner roller 2152 and the second inner roller 2252 is made in this way, the first sliding portion 2150 where the first inner roller 2152 having low elastic coefficient is disposed has a large deformation amount with respect to the transmitting torque as a whole (i.e., has low rigidity), whereas the second sliding portion 2250 where the second inner roller 2252 having high elastic coefficient is disposed has a small deformation amount with respect to the transmitting torque (i.e., has high rigidity).

Additionally, the clearance S211 between the first inner roller 2152 and the inner pin 2308 on the first sliding portion 2150 and the clearance S212 between the first inner roller 2152 and the inner pin hole 2102*a* are set to be smaller than the clearance S221 between the second inner roller 2252 and the inner pin 2308 on the second sliding portion 2250 and the clearance S222 between the second inner roller 2252 and the inner pin hole 2102*a*, respectively, thereby creating a difference in backlash between the first sliding portion 2150 and the second sliding portion 2250.

Since a difference in backlash is created between the first and second sliding portions 2150 and 2250 in this way, the first sliding portion 2150 is characterized by being quick to react the motion of the input shaft 2302 (to reversal or variation of torque) and to the reversing torque from the side of the output shaft 2306, whereas the second sliding portion 2250 is characterized by having a large backlash and being slow to react to both motions (variation of torque) of the input shaft 2302 and the output shaft 2306.

In other words, the power transmission device 2300 includes two power transmission portions disposed in parallel on a path of power transmission that are different from each other in power transmission characteristics, i.e., the power transmission device 2300 includes the first sliding portion 2150 that is high in sliding resistance, low in rigidity, and small in backlash and the second sliding portion 2250 that is low in sliding resistance, high in rigidity, high in transmission efficiency, and large in backlash. Power inputted into the power transmission device 2300 is transmitted to a corresponding apparatus through a first path of power transmission having the route of input shaft 2302→eccentric body 2106→first external gear 2102→sliding portion 2150→inner pin 2308→output shaft 2306 at an early stage of operation, and, after that, is further transmitted to the corresponding apparatus including a second path of power transmission having the route of input shaft 2302 →eccentric body 2106→external gear 2102→second sliding portion 2250→inner pin 2308→output shaft 2306.

In greater detail, immediately after the start of the power transmission device 2300, the first sliding portion 2150 having a small backlash with respect to the input shaft 2302 can swiftly react thereto, and therefore power is transmitted mainly through the first path of power transmission. Immediately after the start in which the acting torque is still small and when a steady operation is performed in a light-load state, the first path of power transmission via the first sliding portion 2150 is used for power transmission. Therefore, power can be transmitted with low noise and slight vibrations.

When the acting torque rises after the start of the device, when the speed is accelerated, and when an intermediate or heavy load is applied, the first sliding portion 2150 will become unable to sustain its reaction force if a difference in rigidity between the first sliding portion 2150 and the second sliding portion 2250 is set to be large. In other words, in this state, the second path of power transmission via the second sliding portion 2250 having higher rigidity is mainly used for power transmission. As a result, transmission capacity can be enlarged. Moreover, since the second sliding portion 2250 is higher in rotation efficiency (i.e., smaller in sliding resistance) than the first sliding portion 2100, the rotation efficiency of the entire power transmission device 2300 can be raised, and heat load can also be reduced.

In contrast, if a difference in rigidity between the first and second sliding portions 2150 and 2250 is set to be relatively small, the first path of power transmission via the first sliding portion 2150 is mainly used for power transmission even when the speed is accelerated and when an intermediate or heavy load is applied.

In the aforementioned embodiment, three of the nine sliding parts constitute the first sliding portion 2150, and the remaining six sliding parts constitute the second sliding portion 2250, so as to make a design for placing major emphasis on, for example, the improvement of rotation efficiency that is a characteristic of the second sliding portion 2250. However, the present invention is not limited to this.

Figure 14:
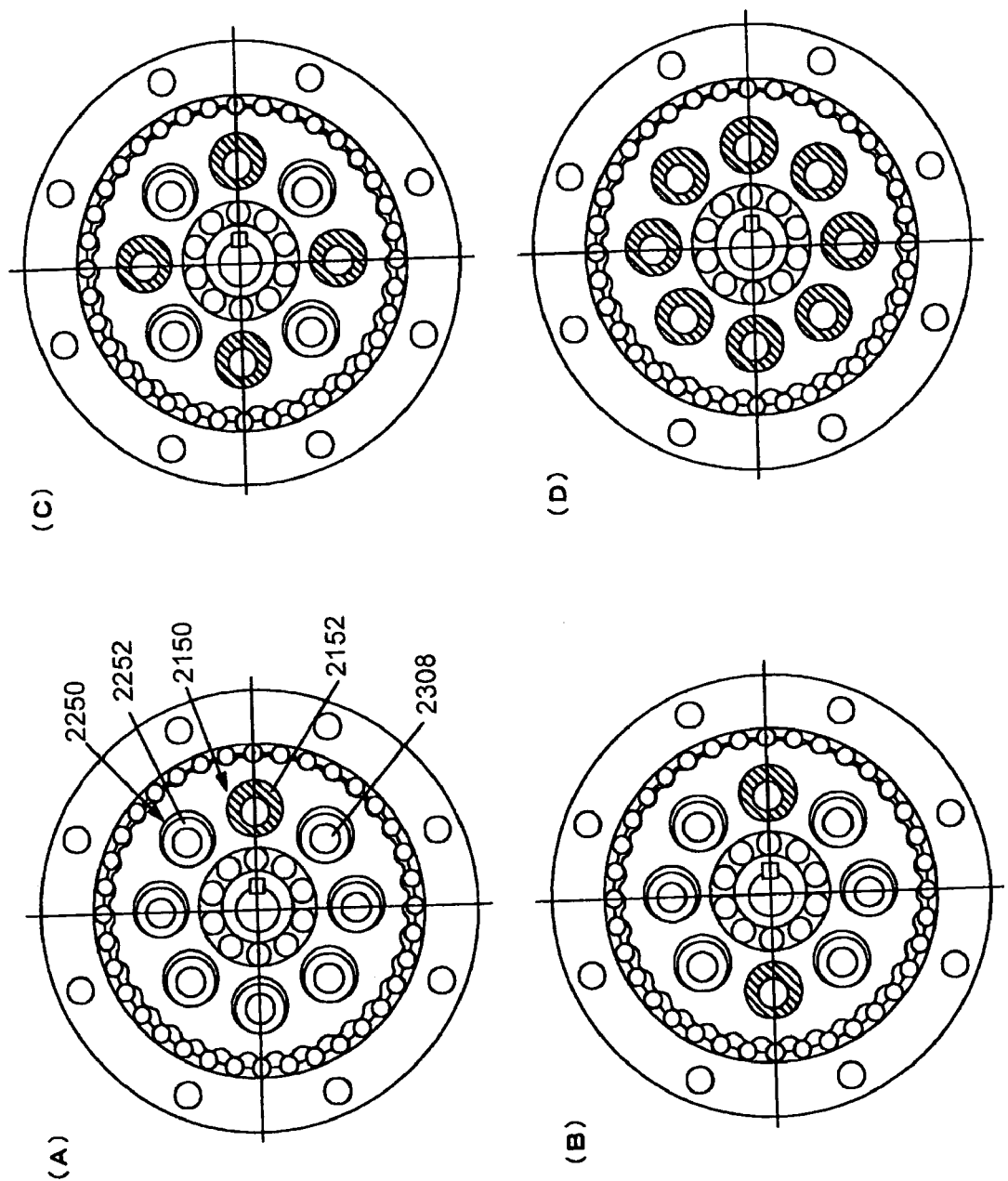
FIG. 14 is a sectional view of the power transmission device according to still another embodiment of the present invention.

That is, as shown in (A) through (D) of FIG. 14, various types of designs according to the purpose of use can be made by changing the ratio between the first and second inner rollers 2152 and 2252 disposed on the first and second sliding portions (in this embodiment, eight places). The inner diameters of the first and second inner rollers 2152 and 2252 are designed to be the same, and the first and second inner rollers 2152 and 2252 can be selectively attached or detached to or from the plurality of inner pins 2308. Therefore, the design can be easily changed according to the purpose of use.

For example, if a design that places a special emphasis on the characteristic of the second sliding portion 2250 is made by disposing the second inner rollers 2252 the number of which is greater than that of the first inner rollers 2152 as shown in (A) and (B) of FIG. 14, transmission efficiency can be further raised when an intermediate or heavy load is applied, and therefore a motor for driving the power transmission device can be reduced in size, and power consumption can be lowered.

Additionally, if a design that places an emphasis on the characteristic of the first sliding portion 2150 is made so that power can be transmitted only through one of the power transmission portions that are caused to differ in power transmission characteristics by fitting only the first inner rollers 2152 to all the inner pins 2308 as shown in (D) of FIG. 14, i.e., so that power can be transmitted only through the first sliding portion 2150, power can be transmitted with low noise and slight vibrations when no load or a light load is applied, and the power transmission device can be provided with a self-locking function (backstop function) because sliding resistance becomes higher.

Figure 15:
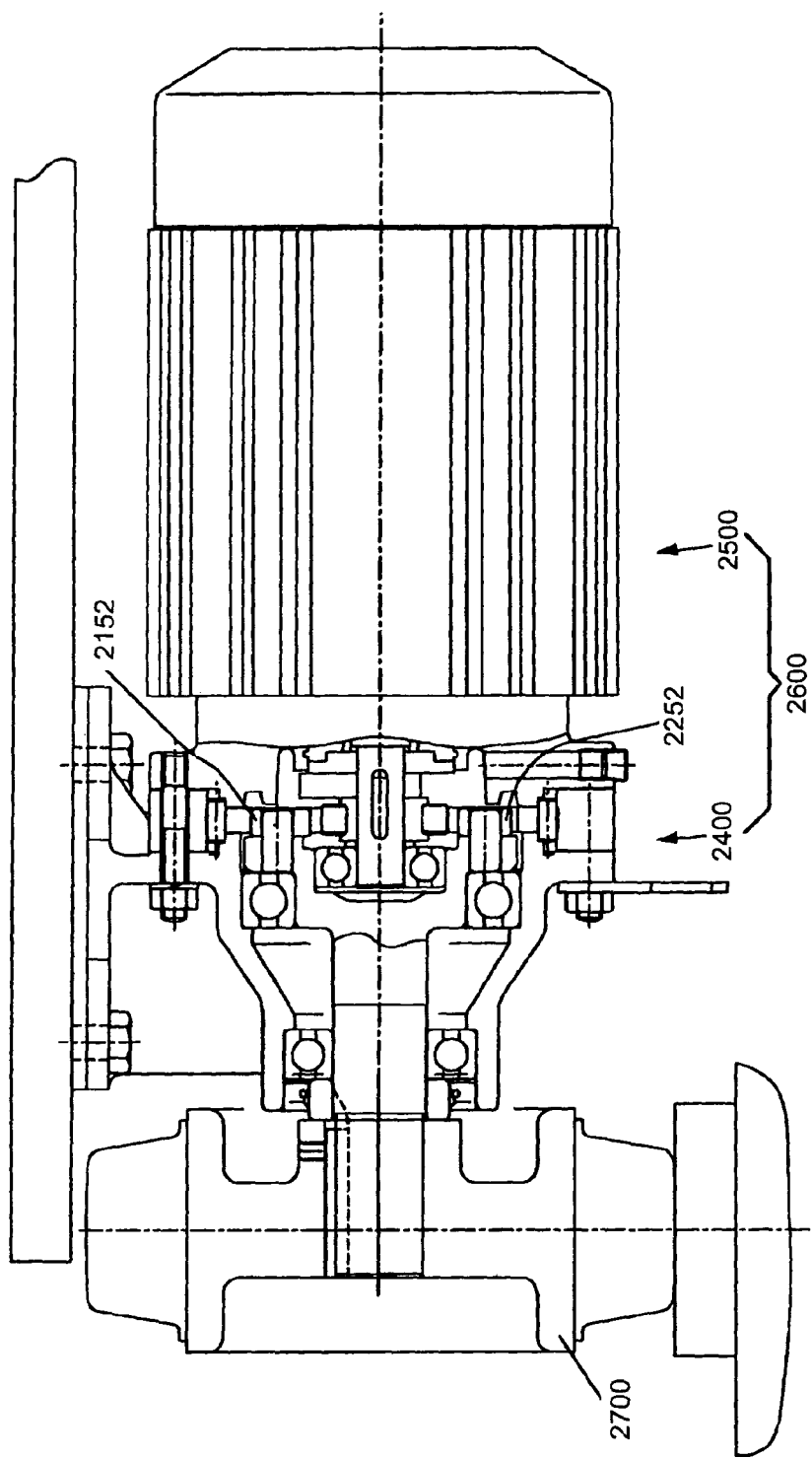
FIG. 15 is a view showing an embodiment in which the power transmission device according to still another embodiment of the present invention is applied to the wheel driving of a traveling truck.

Additionally, if a design that places an emphasis on both the characteristics of the first and second sliding portions 2150 and 2250 is made by disposing the first and second inner rollers 2152 and 2252 that are identical in number (in this embodiment, each four) as shown in (C) of FIG. 14, a high self-locking function can be performed, and the entire device can transmit power at higher transmission efficiency and at higher rotation efficiency than the situation of (D) of FIG. 14 in which the first rollers 2152 are fitted to all the inner pins 2308. For example, a power transmission device 2400 having the thus constructed sliding portions is applicable to the driving of a wheel 2700 of a traveling truck shown in FIG. 15.

Since a driving device 2600 in which a motor 2500 is attached and united with the power transmission device 2400 has high self-locking functionality, the wheel 2700 of the traveling truck can be prevented from rotating in the opposite direction, and cost reduction and size reduction can be achieved without needing a device, such as a brake, used to keep the wheel 2700 of the traveling truck stopping.

In the present invention, special limitations are not imposed on a concrete method for creating a difference in the sliding manner between the sliding portions of the inner pins 2308 and the inner pin holes 2102a, and various methods can be employed. Therefore, for example, the difference in the sliding manner between the first and second sliding portions can be created whether or not slide-advancing members are disposed on the first and second sliding portions.

Additionally, in the aforementioned embodiment, the difference between the first and second sliding portions 2150 and 2250 is created by the first inner roller 2152 that is fitted to the inner pin 2308 and that can come into internal contact with the inner pin hole 2102a on its own entire outer peripheral surface 2152a and by the second inner roller 2252 that is fitted to the inner pin 2308, that has its inner peripheral surface 2252a coaxial with its outer peripheral surface 2252b, and that can come into internal contact with the inner pin hole 2102a on a part of the outer peripheral surface 2252b. However, the present invention is not limited to this. Therefore, if slide-advancing members are disposed on the first and second sliding portions, all that is needed is to change the kind of the slide-advancing member so as to create a difference in sliding manner between the first and second sliding portions. For example, such a difference in the sliding manner therebetween may be created by changing the friction coefficient of each of the materials actually sliding on the sliding portions.

In the aforementioned embodiment, engineering plastic, such as polyacetal, is used as the material of the first inner roller 2152, whereas a bearing steel material is used as the material of the second inner roller 2252. However, the present invention is not limited to this. For example, aluminum or the like may be used for the first inner roller 2152.

Figure 16:
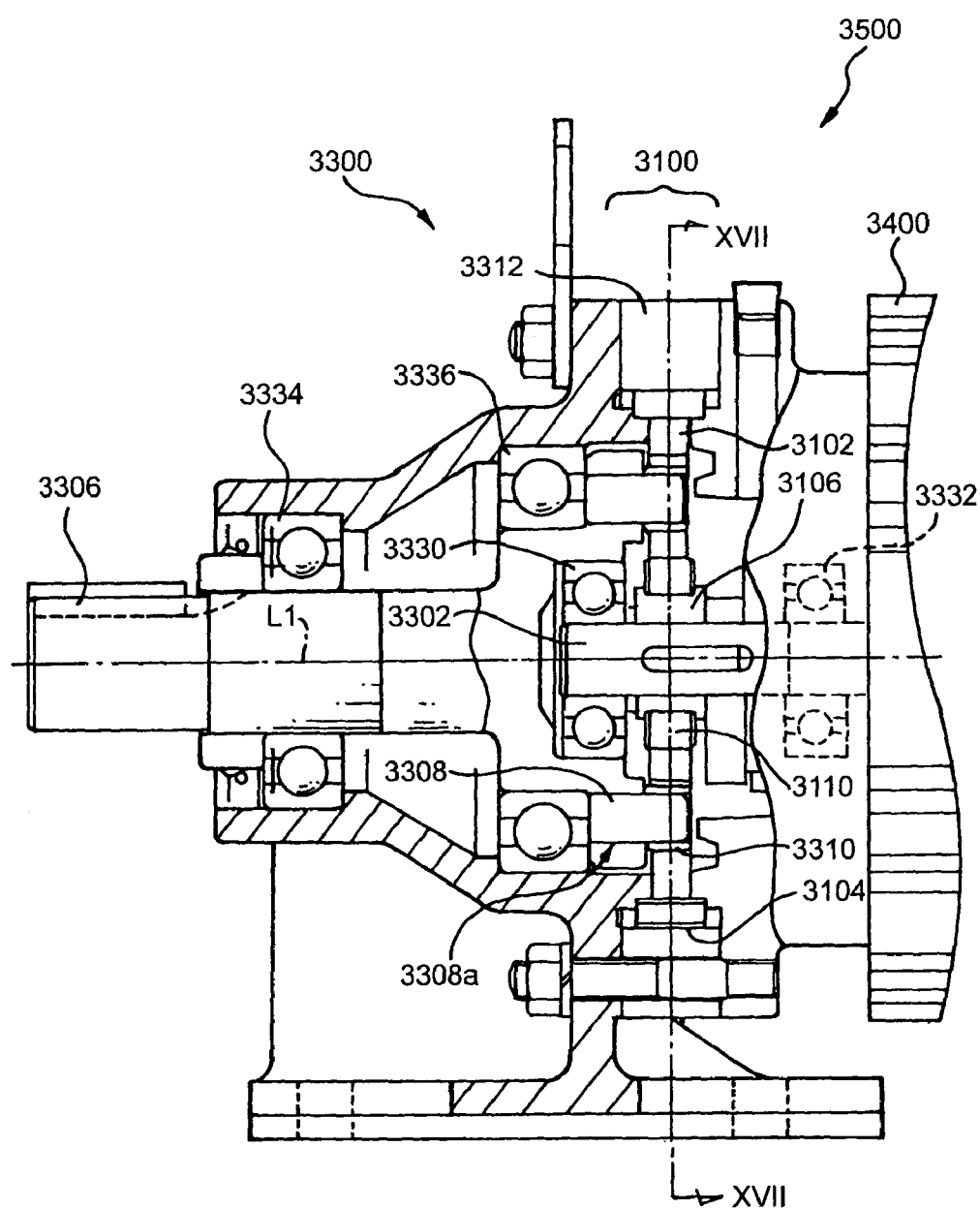
FIG. 16 is a sectional side view of the power transmission device according to still another embodiment of the present invention.

FIG. 16 is a partial sectional side view of a geared motor 3500 to which a power transmission device 3300 according to still another embodiment of the present invention is applied.

The geared motor 3500 includes a motor 3400 (only part of which is shown) and a power transmission device 3300 unitedly attached to the motor 3400.

The power transmission device 3300 includes an input shaft (i.e., motor shaft of the motor 3400) 3302, an output shaft 3306, and an internally meshing planetary gear mechanism 3100. The power transmission device 3300 can transmit power inputted from the motor 3400 to a corresponding apparatus (not shown) through the internally meshing planetary gear mechanism 3100 and the output shaft 3306.

The input shaft 3302 is rotatably supported at both its ends by bearings 3330 and 3332, and can rotate around an axial center L1.

The output shaft 3306 is rotatably supported by bearings 3334 and 3336, and can rotate around the axial center L1 identical to that of the input shaft 3302.

The internally meshing planetary gear mechanism 3100 is disposed between the input shaft 3302 and the output shaft 3306.

Figure 17:
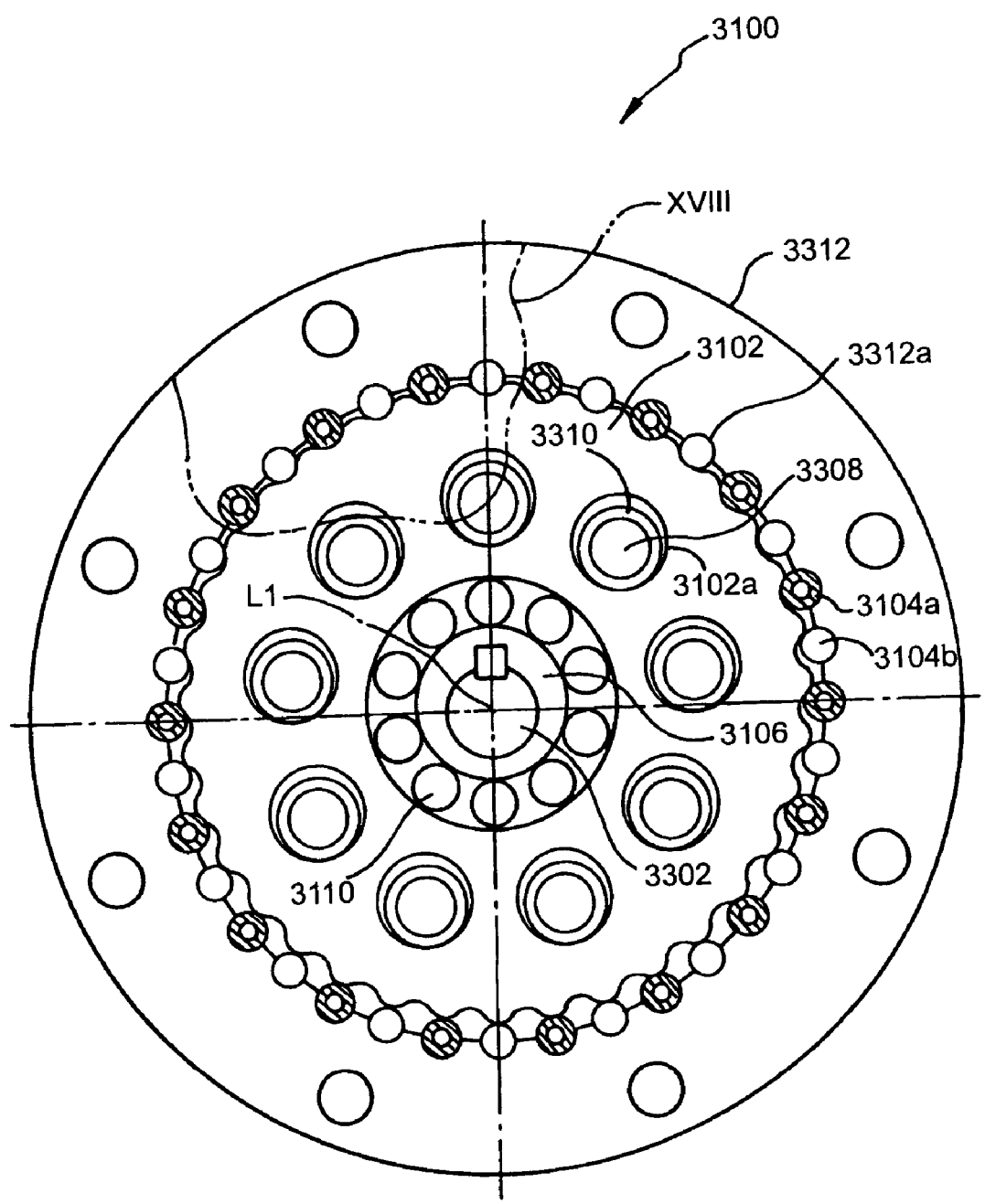
FIG. 17 is a sectional view along line XVI—XVI of FIG. 16.

FIG. 17 is a sectional view along line XVII—XVII of FIG. 16 and shows a cross section of the internally meshing planetary gear mechanism 3100.

As shown in FIG. 16 and FIG. 17, the internally meshing planetary gear mechanism 3100 includes an external gear 3102, an internal gear 3104 the number of teeth of which slightly differs from that of the external gear 3102, an eccentric body 3106, and a roller bearing 3110.

The eccentric body 3106 has an outer periphery that is eccentric with respect to the axial center L1 and is disposed on the outer periphery of the input shaft 3302 between the bearings 3330 and 3332.

Figure 18:
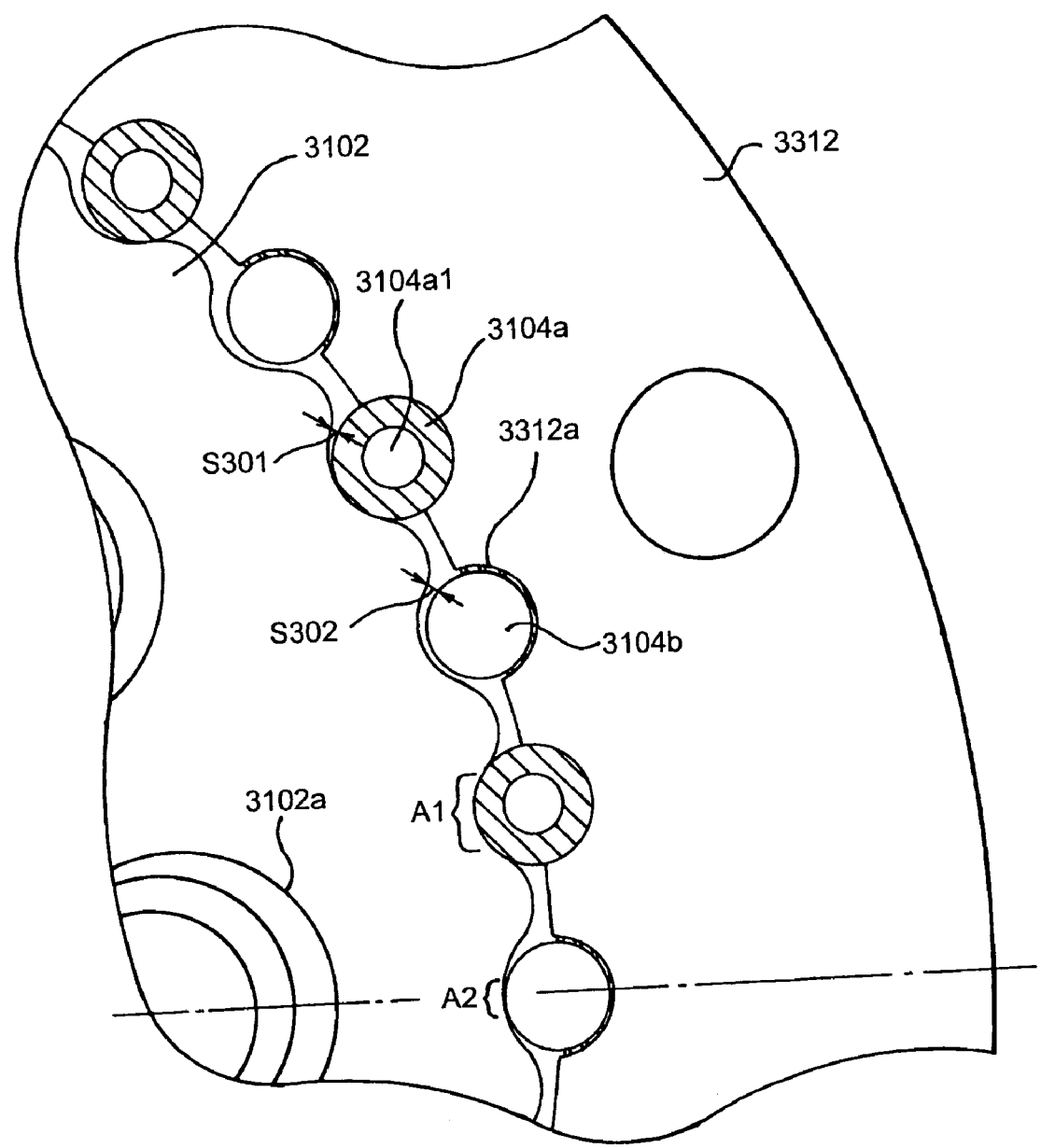
FIG. 18 is a partially enlarged view of an internal gear shown by XVIII of FIG. 17.
Figure 19:
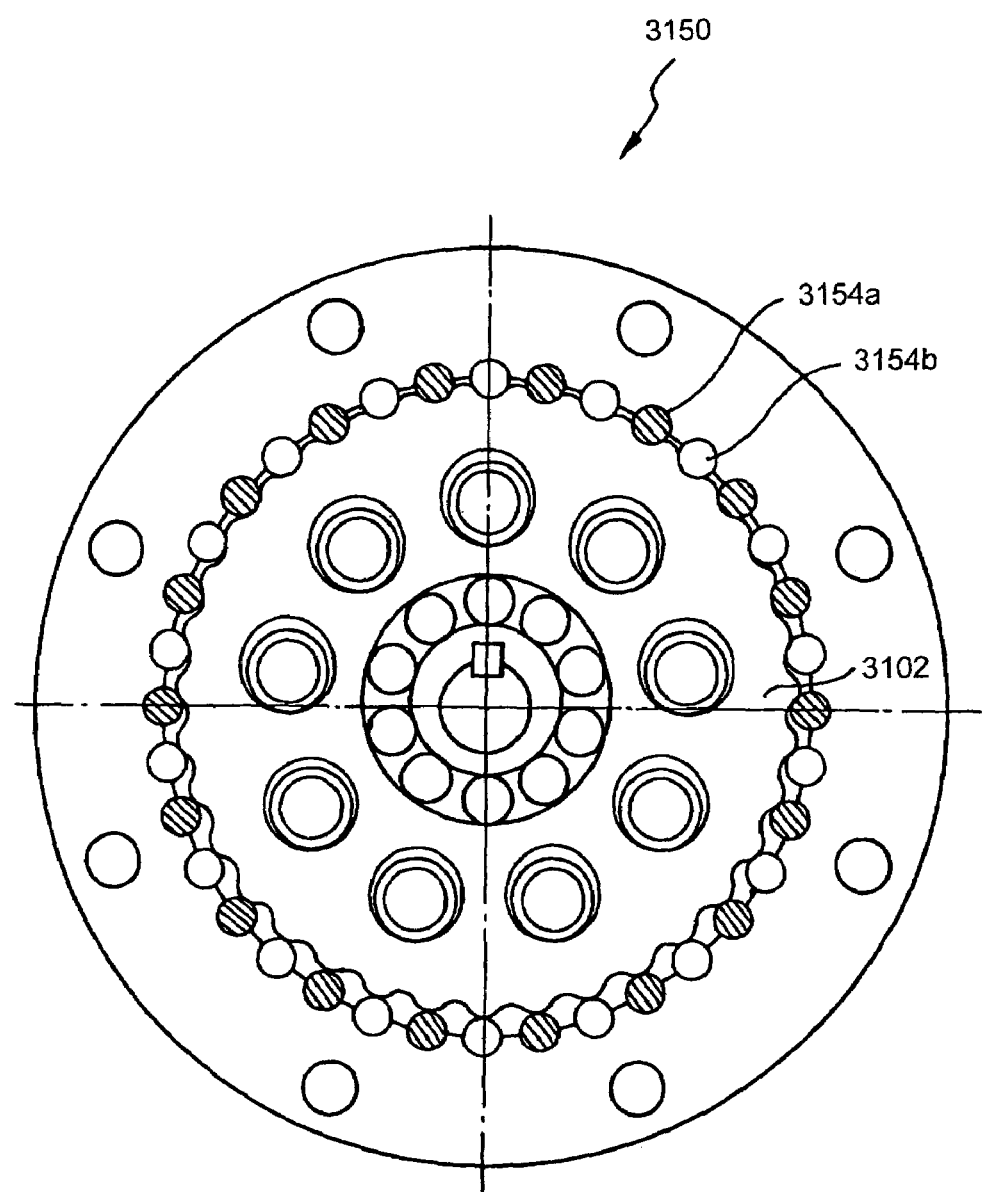
FIG. 19 is a sectional view of the power transmission device according to still another embodiment of the present invention.

As enlargedly shown in FIG. 18, the internal gear 3104 has a structure in which a first outer pin 3104*a* and a second outer pin 3104*b* are each fitted to each of a plurality of circular arc grooves 3312*a* formed in the inner peripheral surface of the casing 3312 which is the main body of the gear. Int his structure, two kinds of pins, i.e., the first and second outer pins 3104*a* and 3104*b* form a plurality of internal teeth of the internal gear 3104. In this embodiment, the first outer pins 3104*a* the number of which is eighteen and the second outer pins 3104*b* the number of which is also eighteen are alternately disposed in the inner peripheral surface of the internal gear 3104.

The first outer pin 3104*a* is a substantially cylindrical member having a hollow part 3104*a*1. The outer diameter of the first outer pin 3104*a* is almost the same as the inner diameter of the circular arc groove 3312*a*. The first outer pin 3104*a* is made of a material lower in elastic coefficient than the second outer pin 3104*b* described later. In this embodiment, engineering plastic, such as polyacetal, is used as the material.

On the other hand, the second outer pin 3104*b* is a subcolumnar shape. The outer diameter of the second outer pin 3104*b* is slightly smaller than that of the first outer pin 3104*a*, i.e., slightly smaller than the inner diameter of the circular arc groove 3312*a*. The second outer pin 3104*b* is made of a material higher in elastic coefficient than the first outer pin 3104*a*. In this embodiment, a bearing steel material is used as the material.

As a result, clearances S301 and S302 between each of the first and second outer pins 3104*a* and 3104*b* and the external gear 3102 described later, and contact areas A1 and A2 between each of the first and second outer pins 3104*a* and 3104*b* and the external gear 3102 are each set to have a difference. In greater detail, the clearance S301 between the external gear 3102 and the first outer pin 3104*a* having low rigidity is smaller than the clearance S302 between the external gear 3102 and the second outer pin 3104*b* having high rigidity. The contact area A1 between the external gear 3102 and the first outer pin 3104*a* having low rigidity is larger than the contact area A2 between the external gear 3102 and the second outer pin 3104*b* having high rigidity. It is to be noted that the clearances S301 and S302 and the contact areas A1 and A2 of FIG. 18 are shown in exaggerated form for convenience of explanation. They are different from actual clearances and areas.

Referring back to FIG. 16 and FIG. 17, the external gear 3102 has external teeth of a trochoidal tooth profile or a circular arc tooth profile on the outer periphery, and internally meshes with the first and second outer pins 3104*a* and 3104*b* of the internal gear 3104. The external gear 3102 is fitted to the eccentric body 3106 through the roller bearing 3110 disposed between the external gear 3102 and the eccentric body 3106, and can oscillate and rotate in response to the rotation of the eccentric body 3106. Further, the external gear 3102 has a plurality of inner roller holes 3102*a* to each of which the inner pin 3308 and the inner roller 3310 are fitted. One end 3308*a* of the inner pin 3308 is supported in a cantilever manner by the output shaft 3306 as shown in FIG. 16, and a rotational component of the external gear 3102 can be transmitted to the output shaft 3306 through the inner pin 3308.

As a result, the power transmission device 3300 appears to have a one-system path of power transmission at first sight, but, in fact, has a first path of power transmission having the route of external gear 3102→inner pin 3308→output shaft 3306, the power transmission characteristic of which is determined by the route of input shaft 3302→eccentric body 3106→first outer pin 3104*a*, and a second path of power transmission having the route of external gear 3102 inner pin 3308→output shaft 3306, the power transmission characteristic of which is determined by the route of input shaft 3302→eccentric body 3106→second outer pin 3104*b*, in which the paths are disposed in parallel. In other words, the power transmission device 3300 has the shared input shaft 3302, the shared external gear 3102, the main body (casing 3312) of the shared internal gear 3104, the shared inner pin 3308 forming a carrier, and the shared output shaft 3306. In this power transmission device 3300, two kinds of internal teeth of the main body of the shared internal gear are disposed so that one kind is used for one (i.e., first outer pin 3104*a*) of the two systems, whereas the other kind is used for the other system (i.e., second outer pin 3104*b*). In the thus constructed power transmission device 3300, switching is performed between a case in which the internal gear 3104 and the external gear 3102 serve for one of the systems and a case in which they serve for the other system, depending on a substantial power-transmissible state created by one of the internal teeth (i.e., first outer pin 3104*a* or second outer pin 3104*b*) and by the external gear 3102 when driven (described later).

Next, the operation of the power transmission device 3300 will be described.

When an electric current is applied to the motor 3400, the input shaft 3302 rotates around the axial center L1, and the eccentric body 3106 provided on the outer periphery of the input shaft 3302 rotates. The external gear 3102 also attempts to oscillate and rotate around the input shaft 3302 in response to the rotation of the eccentric body 3106, but is restrained by the internal gear 3104 made up of the first and second outer pins 3104*a* and 3104*b* from rotating. Therefore, the external gear 3102 almost only oscillates while internally meshing with the internal gear 3104.

An oscillating component of the rotation of the external gear 3102 is absorbed by the inner pin hole 3102*a* and the inner pin 3308, and only a rotational component thereof is transmitted to a corresponding apparatus through the output shaft 3306.

In the power transmission device 3300 in this embodiment, power inputted into the power transmission device 3300 can be transmitted to the corresponding apparatus through paths of power transmission (i.e., first and second paths of power transmission) in which power transmission characteristics are caused to differ from each other by making a difference in the meshing manner between the internal gear 3104 and the external gear 3102. Therefore, the characteristics of the entire power transmission device 3300 can be changed by the respective characteristics of the first and second paths of power transmission to be combined.

Specifically, in the power transmission device 3300, a difference in the meshing manner between the internal gear 3104 and the external gear 3102 is created by making differences between the contact areas A1 and A2 between the first and second outer pins 3104a and 3104b and the external gear 3102.

In greater detail, since the contact area A1 between the first outer pin 3104a and the external gear 3102 is set to be larger than the contact area A2 between the second outer pin 3104b and the external gear 3102, the first outer pin 3104a can stably mesh with the external gear 102, and noise and vibrations can be relatively easily reduced when driven, especially when a light-load operation is performed. On the other hand, since the contact area A2 between the second outer pin 3104b and the external gear 3102 is set to be smaller than the contact area A1 between the first outer pin 3104a and the external gear 3102, the external gear 3102 is low in rotational resistance (i.e., high in rotation efficiency), so that transmission capacity can be enlarged.

Additionally, the first outer pin 3104a is made of a material lower in elastic coefficient than the second outer pin 3104b, and a difference in the meshing manner between the internal gear 3104 and the external gear 3102 is created also by causing the materials of the first and second outer pins 3104a and 3104b to differ from each other. Additionally, the first outer pin 3104a is a substantially cylindrical member having the hollow part 3104a1, whereas the second outer pin 3104b is a subcolumnar shape, and therefore a difference in the meshing manner between the internal gear 3104 and the external gear 3102 is created also by causing the shapes of the first and second outer pins 3104a and 3104b to differ from each other.

Since there are differences in material and in shape between the first and second outer pins 3104a and 3104b as mentioned above, the first outer pin 3104a that is low in elastic coefficient and that has a substantially cylindrical shape has a large deformation amount (low in rigidity and easy to flex) with respect to the transmitting torque as a whole, while the second outer pin 3104b that is high in elastic coefficient and that has a subcolumnar shape has a small deformation amount (high in rigidity and hard to flex) with respect to the transmitting torque as a whole.

Additionally, a difference in the meshing manner between the internal gear 3104 and the external gear 3102 is created also by setting the clearance S301 between the first outer pin 3104a and the external gear 3102 to be smaller than the clearance S302 between the second outer pin 3104b and the external gear 3102.

Since there are differences in the clearances S301 and S302 created in this way between the external gear 3102 and the first and second outer pins 3104a and 3104b, the first outer pin 3104a having the smaller clearance S301 between itself and the external gear 3102 is characterized by being quick to react the motion of the external gear 3102 and to the motions of the input shaft 3302 and the output shaft 3306. On the other hand, the second outer pin 3104b having the larger clearance S302 between itself and the external gear 3102 is characterized by being slow to react to both the motions of the input shaft 3302 and the output shaft 3306.

In other words, the power transmission device 3300 includes the first path of power transmission that has less noise and slight vibrations, that has low rigidity (small transmission capacity), and that is quick to react the torque variation and the second path of power transmission that has low rotational resistance (high efficiency), that has high rigidity (large transmission capacity), and that is slow to react to the torque variation. The two paths of power transmission differ from each other in power transmission characteristics and are disposed in parallel in the single power transmission device 3300. Therefore, at an early operational stage after the start, power inputted into the power transmission device 3300 is transmitted to a corresponding apparatus through the first path of power transmission having the route of external gear 3102→inner pin 3308→output shaft 3306, the power transmission characteristic of which is determined by the route of input shaft 3302→eccentric body 3106→first outer pin 3104a, and, after that, is transmitted to the corresponding apparatus through the second path of power transmission having the route of external gear 3102→inner pin 3308→output shaft 3306, the power transmission characteristic of which is determined by the route of input shaft 3302→eccentric body 3106→second outer pin 3104b.

In greater detail, first of all, immediately after the start of the power transmission device 3300, the first path of power transmission that is quick to react the torque variation (i.e., motion of the input shaft 302) reacts thereto at the earliest, and, accordingly, power is transmitted mainly by the first path of power transmission. Immediately after the start in which the acting torque is still small and when a steady operation is performed to again bring about a light-load state, this first path of power transmission is used to transmit power. As a result, power can be transmitted with low noise and slight vibrations.

On the other hand, the first outer pin 3104a in the first path of power transmission is lower in rigidity than the second outer pin 3104b in the second path of power transmission. Therefore, when the acting torque rises after the start, when the speed is accelerated, and when an intermediate or heavy load is applied, the first outer pin 3104a becomes unable to sustain its reaction force, and the first path of power transmission stops transmitting power. In other words, in this state, the second path of power transmission with high rigidity is mainly used to transmit power and can secure transmission capacity. Moreover, since the second path of power transmission is higher in rotation efficiency (i.e., lower in rotational resistance) than the first path of power transmission, the rotation efficiency of the entire power transmission device 300 can be raised, and heat load can be also reduced.

In this embodiment, a difference is created in all of the rigidity of the first and second pins 3104a and 3104b, the clearance between the external gear 3102 and the first and second outer pins 3104a and 3104b, and the contact area between the external gear 3102 and the first and second outer pins 3104a and 3104b, thus achieving an increase in effect according to their synergistic effects. However, the present invention is not limited to this.

Therefore, for example, a difference in the meshing manner between the internal gear 3104 and the external gear 3102 may be created by allowing only the clearances S301 and S302 between the external gear 3102 and the first and second outer pins 3104a and 3104b to have differences.

In this case, the following structure is employed. The path of power transmission in which the clearance S301 is small (backlash is small) first starts when a light-load operation is performed; thereafter, a load (i.e., reaction force) imposed on the first outer pin 3104a increases in response to the rise of torque, and the first outer pin 3104a becomes unable to sustain the reaction force and undergoes great deformation; thereafter, the second outer pin 3104b of the second path of power transmission in which the clearance S302 is large (backlash is large) comes to contact with the external gear 3102, and the second path of power transmission also transmits power. According to this structure, since the torque is transferred both by the first outer pin 104a of the first path of power transmission and by the second outer pin 3104b of the second path of power transmission when an intermediate or heavy load is applied, transmission capacity can be secured, whereas a low backlash can be achieved. Additionally, rotational smoothness and low noises especially during a light-load operation can be achieved by the second outer pin 3104b the clearance S302 of which is not small.

Likewise, as shown in cFIG. 19, a difference in the meshing manner between the internal gear 3104 and the external gear 3102 may be created by making a difference only in material between the first and second outer pins 3154a and 3154b. Furthermore, a difference only in rigidity or the contact area between the external gear 3102 and the first and second outer pins 3154a and 3154bmay be made to create a difference in the meshing manner between the internal gear 3104 and the external gear 3102. Still another factor such as surface roughness may be applicable to create the meshing manner.

The present invention has many possible variations besides the aforementioned embodiments.

For example, the aforementioned embodiments show the internally meshing planetary gear mechanisms of only two systems serving as power-transmitting mechanisms disposed in parallel. However, without being limited to this, the present invention can include the internally meshing planetary gear mechanisms of three or more systems. In this example, at least two of these systems must be structured to have a difference in power transmission characteristics therebetween.

Additionally, the factors of power transmission characteristics by which a difference is made between the first and second internally meshing planetary gear mechanisms are not limited to three factors, i.e., rotational resistance, rigidity, and backlash. These factors of power transmission characteristics making such a difference may be limited to only one or two of rotational resistance, rigidity, and backlash of a rotation system in each power-transmitting mechanism, or may be still other factors making a difference in power transmission characteristics.

For example, in a situation in which special emphasis is placed on a reduction in backlash but is not placed on the self-locking function according to a purpose of use, it is permissible to form a structure in which backlash is reduced as much as possible and rigidity is lowered so as not to lose operational smoothness because of the reduction in backlash in one of the power-transmitting mechanisms, whereas backlash is enlarged and rigidity is raised in order to improve the smoothness of power transmission and operating efficiency in the other power-transmitting mechanism. In this situation, both the mechanisms may have the same rotational resistance while reducing it within a possible range.

According to this design, immediately after the start, one of the power-transmitting mechanisms can immediately react with a backlash of almost zero (0), and, proportionately with a rise in the acting torque, the leading role of power transmission can be shifted to the other power-transmitting mechanism having higher rigidity. Since the other power-transmitting mechanism can appropriately change its form during operation, rotational smoothness is not obstructed even if the mechanism is constructed with the backlash kept at almost zero.

A concrete structure used to make a difference in power transmission characteristics is also not limited to those of the aforementioned embodiments.

For example, suppose the case in which some difference in something is made between corresponding materials or part of material (for example, between a external gear in one of the power-transmitting mechanisms and a corresponding external gear in the other power-transmitting mechanism). In the case sliding manner is made between the sliding portions for example, the difference maybe made by whether or not a slide-advancing member is used (i.e., whether a slide-advancing member is disposed on the sliding portion or not) besides the method in which the kind of slide-advancing member is changed as shown in the aforementioned embodiments. This applies to a structure according to whether a bearing serving as a slide-advancing member is disposed between the oscillater (eccentric body) and the external gear in each system, or whether an inner roller serving as a slide-advancing member is disposed on the outer periphery of the inner pin in each system, or whether an outer roller serving as a slide-advancing member is disposed on the outer periphery of the outer pin in each system. This applies also to a structure according to whether the sliding portion is provided with a coating material serving as a slide-advancing member in each system.

The difference in kind between the slide-advancing members included a difference in kind between materials of the slide-advancing members.

A concrete sliding portion making such a difference is not limited to a sliding portion between the oscillater and the external gear, a sliding portion between the inner pin hole and the inner pin, and a sliding portion between the circular arc groove and the outer pin.

The present invention is not limited to the aforementioned embodiments even if a difference in the meshing manner is made between the external teeth of the external gear and the internal teeth of the internal gear in order to make a difference in power transmission characteristics. For example, the difference in power transmission characteristics can be also created by changing the diameter or material (including the concept of coating or surface treatment) of the outer pin or by changing the material or tooth profile of the external teeth of the external gear in each system.

Likewise, the material of each member is not limited to those of the aforementioned embodiments. For example, plastics or aluminum may be applied as the material of each member of the mechanism having lower rigidity.

Additionally, the number of outer pins or inner pins or the arrangement of these is not limited to those of the aforementioned embodiments.

All that is required of the deceleration mechanism of the power transmission device according to the present invention is that the deceleration mechanism is an internally meshing planetary gear mechanism that includes an external gear and an internal gear the difference in the number of teeth between which is slight. Thus, the mechanism is not limited to the internally meshing planetary gear mechanisms in the aforementioned embodiments. Therefore, for example, it is possible to employ a so-called split type internally meshing planetary gear mechanism in which an input rotation is split by, for example, a gear into the input shaft (center shaft) and a shaft in parallel therewith, and the eccentric body (oscillater) is disposed on the shaft in parallel therewith so that the external gear eccentrically rotates with respect to the center shaft.

Likewise, it is possible to employ a flexing-mesh type internally meshing mechanism in which a flexible external gear meshes with an internal gear while being flexed by an oval wave generator (oscillater) disposed inside in the radial direction, thereby obtaining the same effect.

INDUSTRIAL APPLICABILITY

The present invention is applicable to all industrial machines or to power transmission devices of consumer products especially since conflicting characteristics can be rationally obtained in accordance with a driving situation.

The invention claimed is:

1. A power transmission device comprising:
an input shaft;
an output shaft;
a plurality of internally meshing planetary gear mechanisms, each including an external gear and an internal gear having external teeth and internal teeth a difference in a number of teeth between which is slight;
wherein at least two of the plurality of internally meshing planetary gear mechanisms are disposed in parallel on a path of power transmission and the at least two of the plurality of internally meshing planetary gear mechanisms are different from each other in power transmission characteristics,
wherein for the at least two of the plurality of internally meshing planetary gear mechanisms to be disposed in parallel on a path of power transmission, a plurality of power-transmissible routes through which power can be transmitted must exist between shared members,
wherein factors of the mutually different power transmission characteristics of the two internally meshing planetary gear mechanisms include at least one of rotational resistance, rigidity, and backlash of a rotation system in each mechanism.

2. The power transmission device according to claim 1, wherein one of the two internally meshing planetary gear mechanisms is set so as to be lower in rigidity and smaller in backlash than the other mechanism.

3. The power transmission device according to claim 2, wherein one of the two internally meshing planetary gear mechanisms is set so as to be higher in rotational resistance, lower in rigidity, and smaller in backlash than the other mechanism.

4. The power transmission device according to claim 1, wherein a difference in sliding manner is created between corresponding sliding-portions of the two internally meshing planetary gear mechanisms.

5. The power transmission device according to claim 4, wherein the difference in the sliding manner between the sliding portions of the two internally meshing planetary gear mechanisms is created by providing the sliding portion on one of the mechanisms with a slide-advancing member and not by providing the corresponding sliding portion on the other one with a slide-advancing member.

6. The power transmission device according to claim 5, wherein each of the two internally meshing planetary gear mechanisms includes an oscillater used to oscillate the external gear, and the difference in the sliding manner between the mechanisms is created by disposing a bearing serving as a slide-advancing member between the oscillater and the external gear on one of the mechanisms and not by disposing a bearing serving as a slide-advancing member at a corresponding place on the other mechanism.

7. The power transmission device according to claim 5, wherein each of the two internally meshing planetary gear mechanisms includes an inner pin hole formed in the external gear and an inner pin loosely fitted to the inner pin hole, and the difference in the sliding manner between the mechanisms is created by disposing an inner roller serving as a slide-advancing member on an outer periphery of the inner pin on one of the mechanisms and not by disposing an inner roller serving as a slide-advancing member at a corresponding place on the other mechanism.

8. The power transmission device according to claim 5, wherein the internal teeth of the internal gears of the two mechanisms are formed by outer pins rotatably disposed in circular arc grooves, and the difference in the sliding manner between the mechanisms is created by disposing outer rollers serving as slide-advancing members on outer peripheries of the outer pins on one of the mechanisms, and not by disposing outer rollers serving as slide-advancing members at corresponding places on the other mechanism.

9. The power transmission device according to claim 5, wherein the difference in the sliding manner between the mechanisms is created by providing a coating material serving as a slide-advancing member at a sliding portion on one of the mechanisms among corresponding sliding portions of the two internally meshing planetary gear mechanisms, and not by providing a coating material serving as a slide-advancing member at a corresponding sliding portion on the other mechanism.

10. The power transmission device according to claim 4, wherein a slide-advancing member is disposed at both sliding portions corresponding to each other of the two internally meshing planetary gear mechanisms, and the difference in the sliding manner between the mechanisms is created by making a difference in kind between the slide-advancing members to be disposed.

11. The power transmission device according to claim 10, wherein each of the two internally meshing planetary gear mechanisms includes an oscillater used to oscillate the external gear, and a roller or ball bearing serving as a slide-advancing member is disposed between the oscillater and the external gear on one of the mechanisms, and a sliding bearing serving as a slide-advancing member is disposed at a corresponding place on the other mechanism.

12. The power transmission device according to claim 10, wherein each of the two internally meshing planetary gear mechanisms includes an inner pin hole formed in the external gear and an inner pin loosely fitted to the inner pin hole, and disposed on one of the mechanisms is a first inner roller serving as the slide-advancing member that can come into internal contact with the inner pin hole on an entire outer periphery of the first inner roller, whereas disposed on the other mechanism is a second inner roller serving as the slide-advancing member that can come into internal contact with the inner roller hole on a part of outer periphery of the second inner pin, the outer peripheral surface of the second inner roller being coaxial with an inner peripheral surface of the second inner roller.

13. The power transmission device according to claim 10, wherein a difference is created in material between the slide-advancing members disposed on the sliding portion of each of the two internally meshing planetary gear mechanisms.

14. The power transmission device according to claim 4, wherein each of the two internally meshing planetary gear mechanisms includes an oscillater used to oscillate the external gear, and a difference is created in the sliding manner of the sliding portion between the oscillater and the external gear.

15. The power transmission device according to claim 4, wherein each of the two internally meshing planetary gear mechanisms includes an inner pin hole formed in the external gear and an inner pin loosely fitted to the inner pin hole, and a difference is created in the sliding manner of the sliding portion between the inner pin hole and the inner pin.

16. The power transmission device according to claim 4, wherein the internal teeth of the internal gear of each of the two internally meshing planetary gear mechanisms are formed by circular arc grooves and outer pins rotatably disposed in the circular arc grooves, and a difference is created in the sliding manner of the sliding portions between the circular arc groove and the outer pin.

17. The power transmission device according to claim 1, wherein a difference is created in meshing manner between the external teeth of the external gear and the internal teeth of the internal gear of the two mechanisms.

18. The power transmission device according to claim 17, wherein a structure of the internal teeth of the internal gear of one of the two mechanisms differs from that of the other mechanism.

19. The power transmission device according to claim 18, wherein the internal teeth of the internal gear of each of the two mechanisms are formed by outer pins, and the outer pin of one of the two mechanisms has a cylinder, and the outer pin of the other one has a column.

20. The power transmission device according to claim 18, wherein the internal teeth of the internal gear of each of the two mechanisms are formed by outer pins, and a difference is created in material of the outer pin between the mechanisms.

21. The power transmission device according to claim 18, wherein the internal teeth of the internal gear of each of the two mechanisms are formed by outer pins, and a difference is created in the outer diameter of the outer pin between the mechanisms.

22. The power transmission device according to claim 18, wherein the internal teeth of the internal gear of each of the two mechanisms are formed by outer pins, and a difference is created in the holding structure of the outer pin between the mechanisms.

23. The power transmission device according to claim 17, wherein a structure of the external teeth of the external gear of one of the two mechanisms differs from that of the other mechanism.

24. The power transmission device according to claim 23, wherein surface treatment of an external-teeth part of the external gear of one of the two mechanisms differs from that of the other mechanism.

25. The power transmission device according to claim 23, wherein a tooth profile of the external teeth of the external gear of one of the two mechanisms differs from that of the other mechanism.

26. The power transmission device according to claim 17, wherein a meshing clearance between the external teeth of the external gear and the internal teeth of the internal gear of one of the two mechanisms differs from that of the other mechanism.

27. The power transmission device according to claim 26, wherein one of the two internally meshing planetary gear mechanisms is set smaller in the meshing clearance and lower in rigidity than the other mechanism.

28. The power transmission device according to claim 17, wherein a contact area between the external teeth of the external gear and the internal teeth of the internal gear of one of the two mechanisms differs from that of the other mechanism.

29. The power transmission device according to claim 28, wherein one of the two internally meshing planetary gear mechanisms is larger in the contact area and lower in rigidity than the other mechanism.

30. The power transmission device according to claim 1, wherein the external gear of each of the two internally meshing planetary gear mechanisms is supported by an inner pin supported by a same output shaft in a cantilever manner, and supporting rigidity of the external gear of the mechanism disposed on a side of the output shaft is set to be higher than that of the external gear of the mechanism disposed on an opposite side thereof.

31. The power transmission device according to claim 1, wherein a difference in the difference number of teeth between a number of teeth of the internal gear and a number of teeth of the external gear is created between the two internally meshing planetary gear mechanisms.

32. The power transmission device according to claim 31, wherein the difference number of one of the two internally meshing planetary gear mechanisms is one, whereas the difference number of the other mechanism is two.

33. The power transmission device according to claim 1, wherein the number of teeth of the external teeth of the external gear of one of the two mechanisms differs from that of the other mechanism, and a difference in the power transmission characteristics is created by setting the number of teeth of the internal teeth of each mechanism to be equal to the number of teeth by which each mechanism can maintain the same change gear ratio.

34. The power transmission device according to claim 33, wherein the internal teeth of the internal gear of each of the two mechanisms are formed based on outer pins the number of which is the same in each mechanism, outer rollers are disposed only at the outer pins that constitute one of the mechanisms, the number of teeth of the internal teeth of the one of the mechanisms is equal to the number of outer pins where the outer rollers are disposed, and the number of teeth of the internal teeth of the other mechanism is equal to the number of all outer pins.

35. The power transmission device according to claim 34, wherein the outer pins are the same in number and in diameter in each mechanism.

36. The power transmission device according to claim 1, wherein a difference in the power transmission characteristics is created by making a difference in an amount of eccentricity of an oscillating gear among the internal and external gears of the two internally meshing planetary gear mechanisms.

37. The power transmission device according to claim 1, wherein a difference in the power transmission characteristics is created by making a difference in material of a part of or all of corresponding members between the two internally meshing planetary gear mechanisms.

38. The power transmission device according to claim 1, wherein the two internally meshing planetary gear mechanisms have a same input shaft, a same carrier, a same output shaft, and two kinds of external gears and internal gears, one kind being for one of the mechanisms, the other kind being for the other mechanism, and both kinds being disposed in parallel.

39. The power transmission device according to claim 1, wherein the two internally meshing planetary gear mechanisms have a same external gear, a same main body of an internal gear, and two kinds of internal teeth of the same main body of the internal gear, one kind being used for one of the mechanisms, the other kind being used for the other mechanism.

40. The power transmission device according to claim 39, wherein the internal teeth for one of the mechanisms and the internal teeth for the other mechanism are alternately disposed in a circumferential direction of the same main body of the internal gear.

41. The power transmission device according to claim 39, wherein the number of teeth of the internal teeth for one of the two mechanisms differs from that of the internal teeth for the other mechanism.

42. The power transmission device according to claim 1, wherein the two internally meshing planetary gear mechanisms have a same external gear, a same internal gear, two kinds of inner pin holes formed in the external gear, one kind being used for one of the mechanisms, the other kind being used for the other mechanism, and two kinds of inner pins or inner rollers constituting a carrier, one kind being used for one of the mechanisms, the other kind being used for the other mechanism.

43. The power transmission device according to claim 42, wherein the inner pins or the inner rollers for one of the two mechanisms and the inner pins or the inner rollers for the other mechanism are alternately disposed in a circumferential direction.

44. The power transmission device according to claim 43, wherein the number of the inner pins or the inner rollers for one of the two mechanisms differs from that of the inner pins or the inner rollers for the other mechanism.

* * * * *

UNITED STATES PATENT AND TRADEMARK OFFICE
CERTIFICATE OF CORRECTION

PATENT NO. : 7,147,582 B2
APPLICATION NO. : 10/650131
DATED : December 12, 2006
INVENTOR(S) : Minegishi et al.

It is certified that error appears in the above-identified patent and that said Letters Patent is hereby corrected as shown below:

On the Title Page of the Patent

In Item (75):

The last name of the first inventor should read:

-- Minegishi--

Signed and Sealed this

Twentieth Day of March, 2007

JON W. DUDAS
*Director of the United States Patent and Trademark Office*